(12) United States Patent  (10) Patent No.: US 8,002,301 B2
Weagle                     (45) Date of Patent:     Aug. 23, 2011

(54) VEHICLE SUSPENSION SYSTEMS FOR SEPERATED ACCELERATION RESPONSES

(75) Inventor: David Weagle, Edgartown, MA (US)

(73) Assignee: Split Pivot, Inc., Edgartown, MA (US)

( * ) Notice: Subject to any disclaimer, the term of this patent is extended or adjusted under 35 U.S.C. 154(b) by 564 days.

(21) Appl. No.: 11/895,269

(22) Filed: Aug. 23, 2007

(65) Prior Publication Data

US 2008/0073868 A1  Mar. 27, 2008

Related U.S. Application Data

(63) Continuation-in-part of application No. 11/510,522, filed on Aug. 25, 2006, now Pat. No. 7,717,212.

(51) Int. Cl.
*B62K 3/02* (2006.01)

(52) U.S. Cl. ........ 280/284; 280/283; 280/285; 280/286; 280/288; 180/227

(58) Field of Classification Search .......... 280/283–288; 180/277
See application file for complete search history.

(56) References Cited

U.S. PATENT DOCUMENTS

| 439,095 | A |   | 10/1890 | Becker |        |
|---------|---|---|---------|--------|--------|
| 1,043,269 | A |  | 11/1912 | Stephenson | |
| 1,047,430 | A |  | 12/1912 | Michaelson | |
| 1,147,415 | A | * | 7/1915 | McLeod | 280/284 |
| 1,275,460 | A | * | 8/1918 | Newberry | 280/286 |
| 1,298,958 | A |   | 4/1919 | Johnston | |
| 3,917,313 | A | * | 11/1975 | Smith et al. | 280/284 |
| 4,497,506 | A | * | 2/1985 | Miyakoshi et al. | 280/124.105 |
| 4,789,174 | A |  | 12/1988 | Lawwill | |
| 5,121,937 | A |  | 6/1992 | Lawwill | |
| 5,217,241 | A |  | 6/1993 | Girvin | |
| 5,244,224 | A |  | 9/1993 | Busby | |
| 5,306,036 | A |  | 4/1994 | Busby | |
| 5,332,246 | A | * | 7/1994 | Buell | 280/284 |
| 5,409,249 | A |  | 4/1995 | Busby | |
| 5,441,292 | A |  | 8/1995 | Busby | |
| 5,474,318 | A |  | 12/1995 | Castellano | |
| 5,509,679 | A |  | 4/1996 | Leitner | |
| 5,553,881 | A |  | 9/1996 | Klassen et al. | |
| 5,628,524 | A |  | 5/1997 | Klassen et al. | |
| 5,671,936 | A |  | 9/1997 | Turner | |

(Continued)

FOREIGN PATENT DOCUMENTS

EP    0538012 A1    4/1993

(Continued)

OTHER PUBLICATIONS

Crestone Peak Bikes, Crestone Peak Bikes '94, printout from website http://mombat.org/Crestone.htm, date of publication unknown, 5 pages, not numbered, publisher name, city and country unknown.

*Primary Examiner* — Anne Marie Boehler
*Assistant Examiner* — Maurice Williams
(74) *Attorney, Agent, or Firm* — Stahl Law Firm

(57) ABSTRACT

The invention relates to suspension systems comprising, in certain embodiments, a pivoting means concentric to a wheel rotation axis so that braking forces can be controlled by placement of an instant force center, and so that acceleration forces can be controlled by a swinging wheel link.

97 Claims, 18 Drawing Sheets

U.S. PATENT DOCUMENTS

| | | | |
|---|---|---|---|
| 5,678,837 A | 10/1997 | Leitner | |
| 5,791,674 A | 8/1998 | D'Aluisio et al. | |
| 5,899,480 A | 5/1999 | Leitner | |
| 5,957,473 A * | 9/1999 | Lawwill | 280/284 |
| 6,102,421 A | 8/2000 | Lawwill et al. | |
| 6,199,886 B1 | 3/2001 | Guenther | |
| 6,203,042 B1 | 3/2001 | Wilcox | |
| 6,206,397 B1 | 3/2001 | Klassen et al. | |
| 6,237,706 B1 | 5/2001 | Karpik et al. | |
| 6,263,994 B1 | 7/2001 | Eitel | |
| 6,378,885 B1 | 4/2002 | Ellsworth et al. | |
| 6,382,381 B1 * | 5/2002 | Okajima et al. | 192/64 |
| 6,406,048 B1 * | 6/2002 | Castellano | 280/284 |
| 6,450,521 B1 | 9/2002 | Turner | |
| 6,471,230 B2 | 10/2002 | Ellsworth et al. | |
| 6,592,108 B1 | 7/2003 | Luede | |
| 6,595,538 B2 | 7/2003 | Ellsworth et al. | |
| 6,663,126 B2 * | 12/2003 | Britton et al. | 280/204 |
| 6,698,780 B2 | 3/2004 | Miyoshi | |
| 6,843,494 B2 | 1/2005 | Lam | |
| 6,854,753 B2 | 2/2005 | Turner | |
| 6,969,081 B2 | 11/2005 | Whyte | |
| 7,044,874 B2 * | 5/2006 | Shahana et al. | 474/82 |
| 2001/0024024 A1 | 9/2001 | Klassen et al. | |
| 2003/0038450 A1 | 2/2003 | Lam | |
| 2003/0047905 A1 * | 3/2003 | Duval | 280/284 |
| 2003/0090082 A1 | 5/2003 | Ellsworth et al. | |
| 2005/0057018 A1 | 3/2005 | Saiki | |
| 2006/0033306 A1 * | 2/2006 | Sanchez | 280/283 |
| 2006/0071442 A1 * | 4/2006 | Hoogendoorn | 280/275 |
| 2009/0020978 A1 * | 1/2009 | Savard | 280/238 |

FOREIGN PATENT DOCUMENTS

| | | |
|---|---|---|
| EP | 0912391 B1 | 5/1999 |
| FR | 2 774 966 | 8/1999 |
| GB | 1 498 168 | 1/1978 |
| WO | WO03/018392 | 3/2003 |
| WO | WO03/037701 | 5/2003 |

* cited by examiner

VEHICLE SUSPENSION SYSTEMS FOR SEPERATED ACCELERATION RESPONSES

This application is a continuation-in-part of U.S. application Ser. No. 11/510,522 filed Aug. 25, 2006, now U.S. Pat. No. 7,717,212, which is incorporated herein by reference.

1.0 FIELD OF THE INVENTION

This invention relates to suspension systems capable of separating acceleration responses.

2.0 BACKGROUND

Automobiles, bicycles, motorcycles, all terrain vehicles, and other wheel driven vehicles are used for various purposes, including transportation and leisure. These vehicles are designed to use a power source to drive through a power transmission system to a wheel or wheels, which transfers rotary motion to the ground via tractive force between a wheel or wheels and the ground. Vehicles are also used to traverse even terrain like paved streets, and uneven terrain like off-road dirt trails. Off road trails are generally bumpier and allow for less wheel traction than paved roads. A bumpier terrain is best navigated with a vehicle that has a suspension system. A suspension system in a vehicle is aimed to provide a smoother ride for an operator or rider, and increase wheel traction over varied terrain. Vehicle suspension systems for the front wheel and for the back wheel are available. These vehicles have means of powered acceleration and deceleration. Powered acceleration can be achieved through machine or human power rotating a wheel through a mechanical arrangement. Deceleration can be achieved through the use of a braking system that mechanically impedes rotation of a wheel.

One undesirable effect of suspension systems is unwanted responses or suspension compression or extension during powered acceleration or deceleration. Acceleration and deceleration forces cause a suspension system to react in different ways. It is beneficial to rider comfort for a suspension to be designed to specifically recognize and respond to differing acceleration and deceleration forces. Complex systems using linkages or hydraulic means exist to reduce unwanted suspension movement that occurs during acceleration or deceleration. The drawback to these other systems is their complexity and associated cost. With more complex designs, more expensive manufacturing techniques are required to build them. Less complex systems are more cost effective, but do not allow for the separation of acceleration forces under powered acceleration and braking, which reduces suspension effectiveness, but allows a lower overall cost.

A need exists for suspension systems that can provide separated acceleration and deceleration responses while remaining cost effective to produce. The present invention provides new suspension systems for vehicles that can provide separated acceleration responses and that are cost effective.

3.0 SUMMARY OF THE INVENTION

The current invention relates to new suspension systems for vehicles, for example, bicycles, motorcycles, cars, SUVs, trucks, two wheel vehicles, four wheel vehicles, front wheel suspension vehicles, driven wheel suspension vehicles, and any other kind of vehicle with a suspension system. In certain embodiments of the invention, a suspension system of the invention can support a wheel using a link arrangement to control suspension movement by manipulating braking forces present in the links during deceleration.

Suspension systems of the invention are useful for a variety of vehicles and preferably in human powered vehicles. Unwanted suspension movement can have a significant detrimental effect on rider performance and comfort. The need for a suspension system that can control suspension movement under acceleration and deceleration has therefore become more pressing. The present invention provides suspension system designs for vehicles that reduce unwanted suspension movements during acceleration and deceleration.

Certain embodiments of the invention can comprise a wheel suspension system where a wheel is connected to a wheel link. In certain embodiments, a braking arrangement intended to impede wheel rotation when needed is attached to a brake link. The brake link, in certain embodiments, may be attached to the wheel link through a pivoting or flexing connection concentric to the wheel rotation axis, and attached at another point through a pivoting or flexing connection to a control link. The brake link, in certain embodiments, can be attached to the wheel link through a pivoting and/or flexing connection, and in certain other embodiments the brake link is attached at another point through a pivoting and/or flexing connection to a control link. The control link and wheel link, in certain embodiments, each have a link force line. A link force line of a control link and a wheel link, in certain embodiments, intersect in a point called instant force center. The location of this instant force center, in certain embodiments, governs suspension reaction to deceleration as a result of braking.

Certain embodiments of the invention can comprise a shock absorber. A shock absorber, in certain embodiments, may be a damper, a spring, a compression gas spring, a leaf spring, a coil spring, or a fluid. In certain other embodiments, a shock absorber is mounted so that it is able to respond to movement of a rear wheel. In certain embodiments, a shock absorber is mounted to a brake link. In certain embodiments, a shock absorber is mounted to a control link. In certain embodiments, a shock absorber is mounted to a brake link and/or a control link in a pivotal manner, and preferably so that a force that compresses or extends the shock absorber is transmitted through a brake link or a control link.

4.0 BRIEF DESCRIPTION OF THE DRAWINGS

5.0 DETAILED DESCRIPTION

Figure 1:
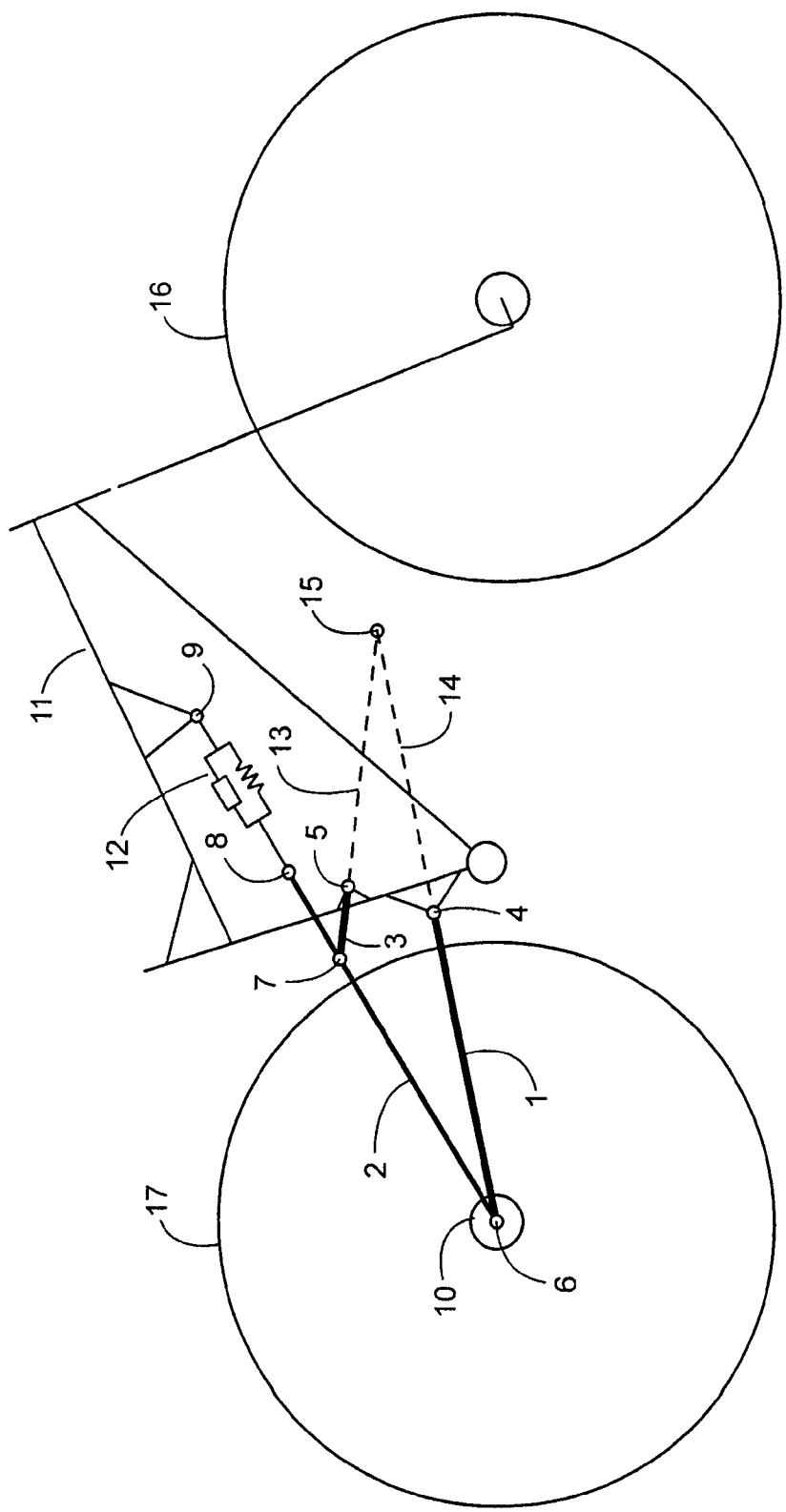
FIG. 1 shows a diagrammatical side view of a vehicle using a wheel suspension system that according to certain embodiments of the current invention. The vehicle is shown with the wheel suspension system in an uncompressed state.

Vehicles must be accelerated against their environment to propel an operator or rider across terrain. In order to accelerate these vehicles, a certain amount of energy must be exerted and transformed into rotary motion at a wheel or plurality of wheels. Suspended wheeled vehicle energy conversion types are widely varied. Some vehicles like bicycles, tricycles, and pedal cars use converted human energy as the drive unit. Other vehicles use electric motors or combustion engines, as their drive unit. These electric motors and combustion engines extract rotary motion through the controlled release of chemically stored energy.

Almost all vehicle types use some sort of rotary motion transmission system to transfer rotational force from a drive unit to a wheel or plurality of wheels. A simple bicycle or motorcycle or all terrain vehicle uses a chain or belt to transfer power from a drive unit to a wheel. These chain or belt drive transmissions typically use one sprocket in the front which is coupled to a drive system and one sprocket in the rear which is coupled to a wheel.

More complex bicycles, motorcycles, all terrain vehicles, and automobiles use a shaft drive system to transfer power from a drive system to a driven wheel or wheels. These shaft drive systems transfer power through a rotating shaft that is usually reasonably perpendicular to the driven wheel spinning axis, with power transferred to the driven wheel via a bevel, spiral bevel, hypoid, worm gear drivetrain, or some other means. These single sprocket chain and belt, and shaft driven vehicles can use a direct driven single speed arrangement, where drive unit output shaft speed and torque is transferred to the driven wheel at a constant unchanging ratio. These single sprocket chain and belt, and shaft driven vehicles can also use a commonly found multi speed arrangement, where drive unit output shaft speed and torque is transferred to the driven wheel at a variable ratio through operator selected or automatically selected ratio changing mechanisms.

A bicycle with a more advanced design includes gear changing systems that have clusters of selectable front chainrings and rear sprockets. These gear changing systems give the bicycle rider a selectable mechanical advantage for use during powered acceleration. The mechanical advantage selection, allows a rider spinning a front sprocket cluster via crank arms, to attain lower revolution speed and higher torque values, or conversely, higher revolution speed and lower torque values at a driven wheel.

The current invention, in certain embodiments, is directed at suspension systems for vehicles that can reduce unwanted suspension movement during braking deceleration, for example, a bicycle, a motorcycle, a car, an SUV, a truck, or any other kind of vehicle. Suspension systems of the current invention are useful for a large variety of vehicles, including, but not limited to, human powered vehicles, off road use vehicles with long displacement suspension, high efficiency road going vehicles, and other vehicles.

A vehicle suspension system isolates a vehicle chassis from forces imparted on the vehicle when traversing terrain by allowing the vehicle's ground contact points to move away from impacts at the terrain level and in relation to the vehicle chassis by a compressible suspension movement. The compressible suspension movement that isolates a chassis from these impacts is called suspension displacement or suspension travel. Compressible suspension travel has a beginning point where the suspension is in a completely uncompressed state (the suspension is uncompressed), and an ending point of displacement, where the suspension is in a completely compressed state (the suspension is fully compressed). Suspension travel displacement is measured in a direction parallel to and against gravity. As a suspension system using certain embodiments the invention is compressed, a shock absorber is compressed. As the shock absorber is compressed, the force output from the unit rises. Pivots of a suspension system of the invention are named after a component that connects with the pivot. A pivot may be fixed or floating. A fixed pivot maintains a position relative to the frame of the vehicle when the suspension is compressed. A floating pivot changes its position relative to the frame of the vehicle when the suspension is compressed. A suspended wheel has a compressible wheel suspension travel distance that features a beginning travel point where the suspension is completely uncompressed to a point where no further suspension extension can take place, and an end travel point where a suspension is completely compressed to a point where no further suspension compression can take place. At the beginning of the wheel suspension travel distance, when the suspension is in a completely uncompressed state, the shock absorber is in a state of least compression, and the suspension is easily compressed. As the suspended wheel moves compressively, shock absorber force at the wheel changes in relation to shock absorber force multiplied by a leverage ratio, where a leverage ratio is the ratio of compressive wheel travel change divided by shock absorber measured length change over an identical and correlating given wheel travel distance.

5.1 The Drawings Illustrate Examples of Certain Embodiments of the Invention The Figures in this disclosure use the following numbers and terms; wheel link (1); brake link (2); control link (3); wheel link fixed pivot (4); control link fixed pivot (5); wheel link floating pivot (6); control link floating pivot (7); first shock pivot (8); second shock pivot (9); wheel (or hub) rotation axis (10); frame (11); shock absorber (12); control link force line (13); wheel link force line (14); instant force center (15); front wheel (16); rear wheel (17); rear hub (18); brake mount (19); pivot bearing (20); pivot axle (21); thru axle (22); quick release lever (23); quick release mechanism (24); pivot axle nut (25); derailleur hanger (26); axle axial stop (27); release position (28); release clearance area (29); compression force (30); compression force distribution (31); ground plane (32); incremental vertical compression distance (33); shock absorber length (34); leverage rate curve (35); beginning ⅓ (36); middle ⅓ (37); end ⅓ (38).

FIG. 1 presents a design for a suspension according to certain embodiments of the current invention via a two-dimensional side view. Shown in FIG. 1 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 1. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 1. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The brake link 2 is attached to a shock absorber 12 via a first shock pivot 8. The shock absorber 12 is mounted to the frame 11 via a second shock pivot 9. The movement of the first shock pivot 8 and stationary location of the second shock pivot 9 causes the shock absorber 12 to change length as the suspension is moved to a state of full compression. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 2:
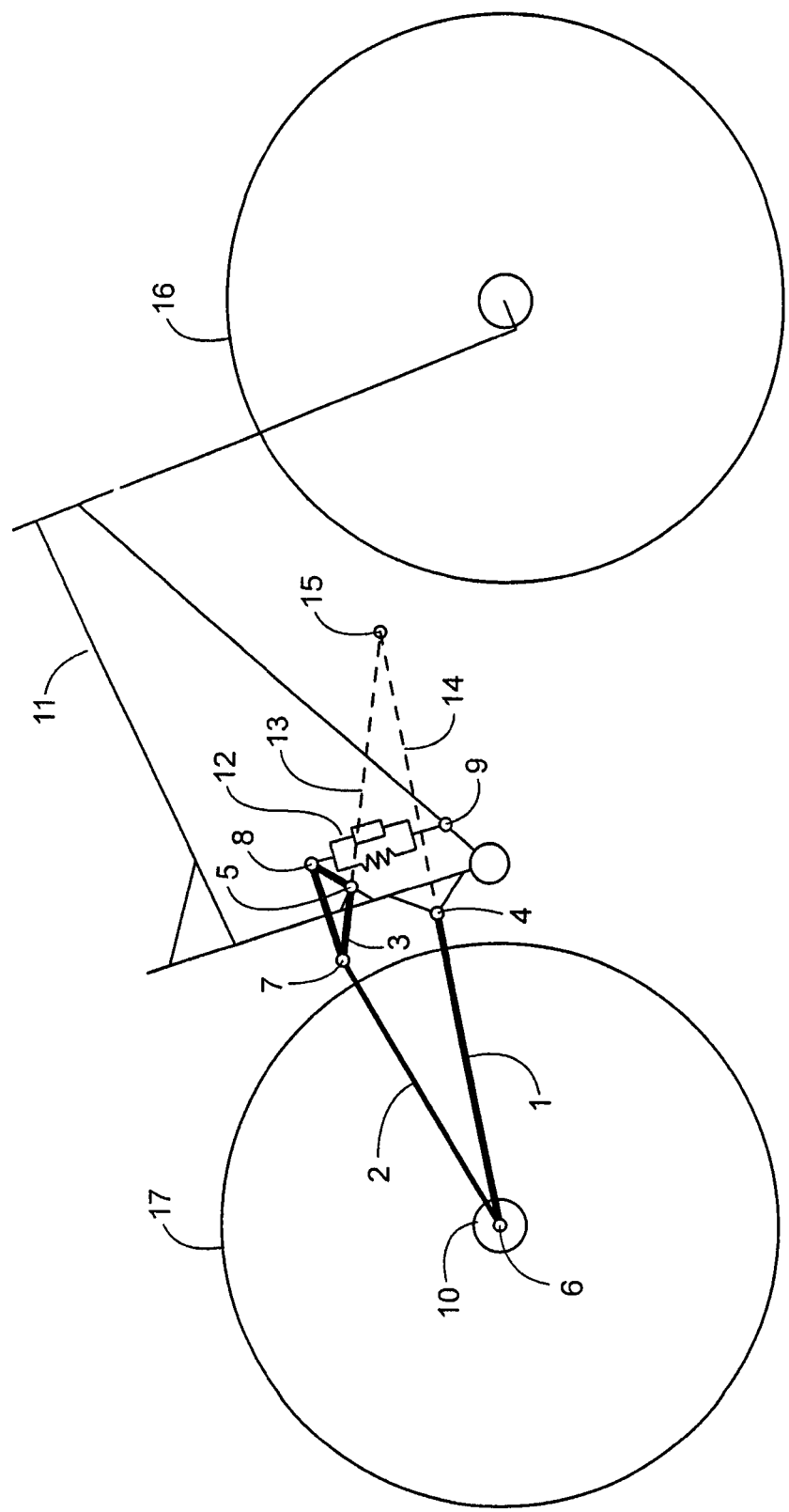
FIG. 2 shows a diagrammatical side view of a vehicle using a wheel suspension system that according to certain embodiments of the current invention. The vehicle is shown with the wheel suspension system in an uncompressed state.

FIG. 2 presents a design for a suspension according to certain embodiments of the current invention via a two-dimensional side view. Shown in FIG. 2 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 2. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 2. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The control link 3 is attached to a shock absorber 12 via a first shock pivot 8. The shock absorber 12 is mounted to the frame 11 via a second shock pivot 9. The movement of the first shock pivot 8 and stationary location of the second shock pivot 9 causes the shock absorber 12 to change length as the suspension is moved to a state of full compression. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 3:
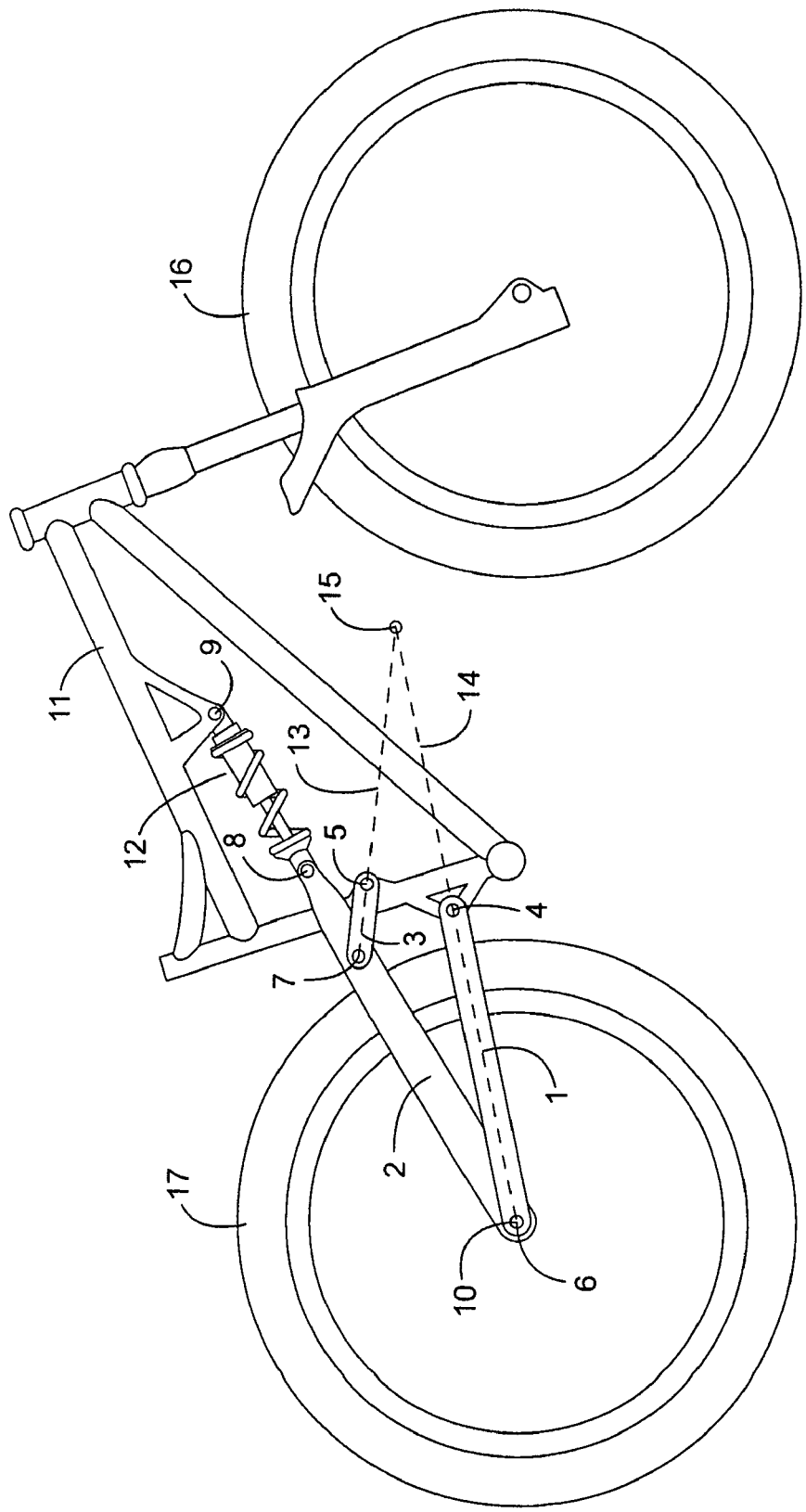
FIG. 3 shows a side view of a bicycle using the wheel suspension system shown in FIG. 1.

FIG. 3 presents a design as shown in FIG. 1 for a suspension according to certain embodiments of the current invention via a two-dimensional side view. FIG. 3 shows a representation of a frame structure and a suspension of the invention that could be used in a bicycle application. Shown in FIG. 3 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17).

Figure 4:
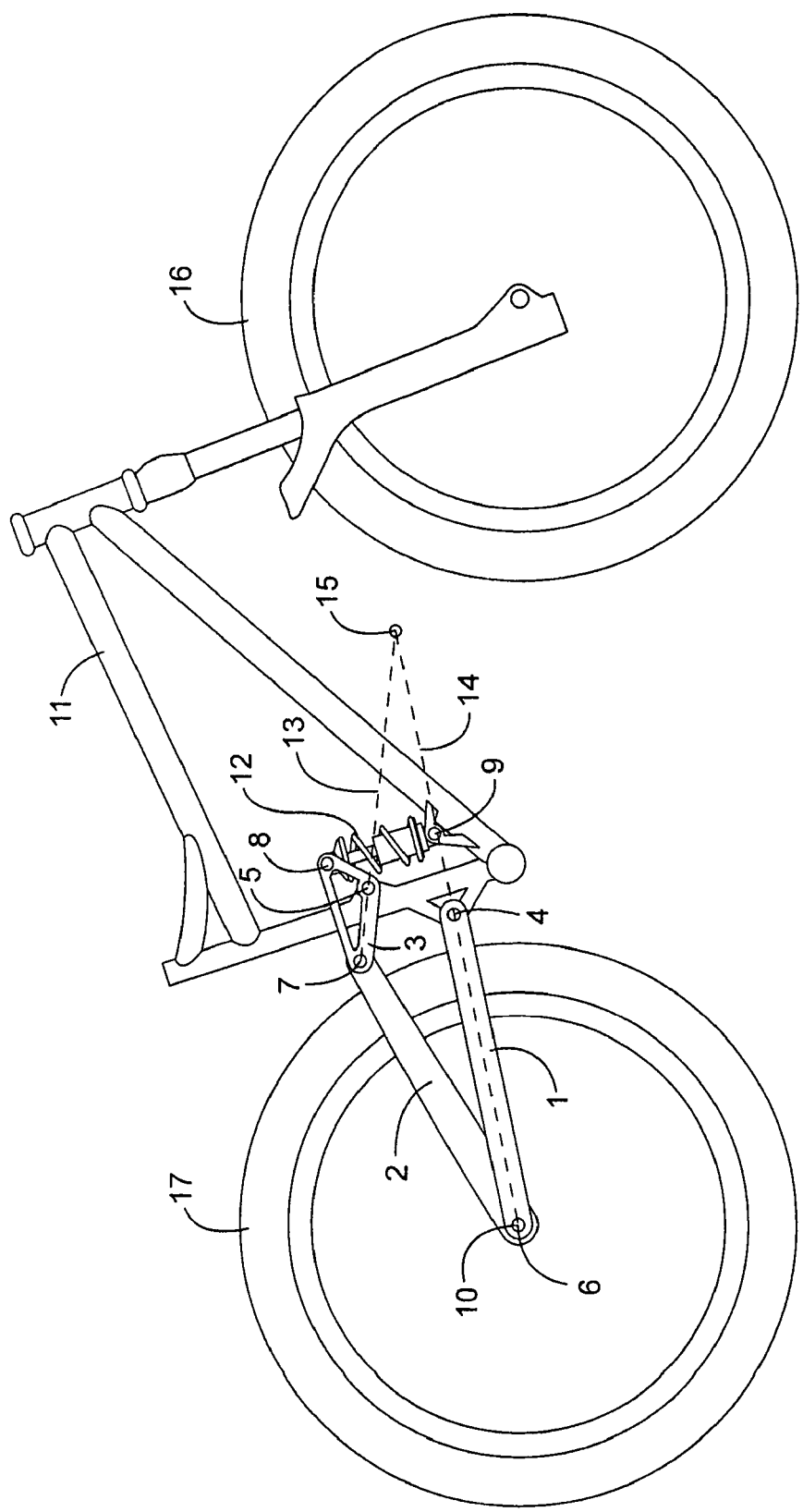
FIG. 4 shows a side view of a bicycle using the wheel suspension system shown in FIG. 2.

FIG. 4 presents a design as shown in FIG. 2 for a suspension according to certain embodiments of the current invention via a two-dimensional side view. FIG. 4 shows a representation of a frame structure and a suspension of the invention that could be used in a bicycle application. Shown in FIG. 4 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17).

Figure 5:
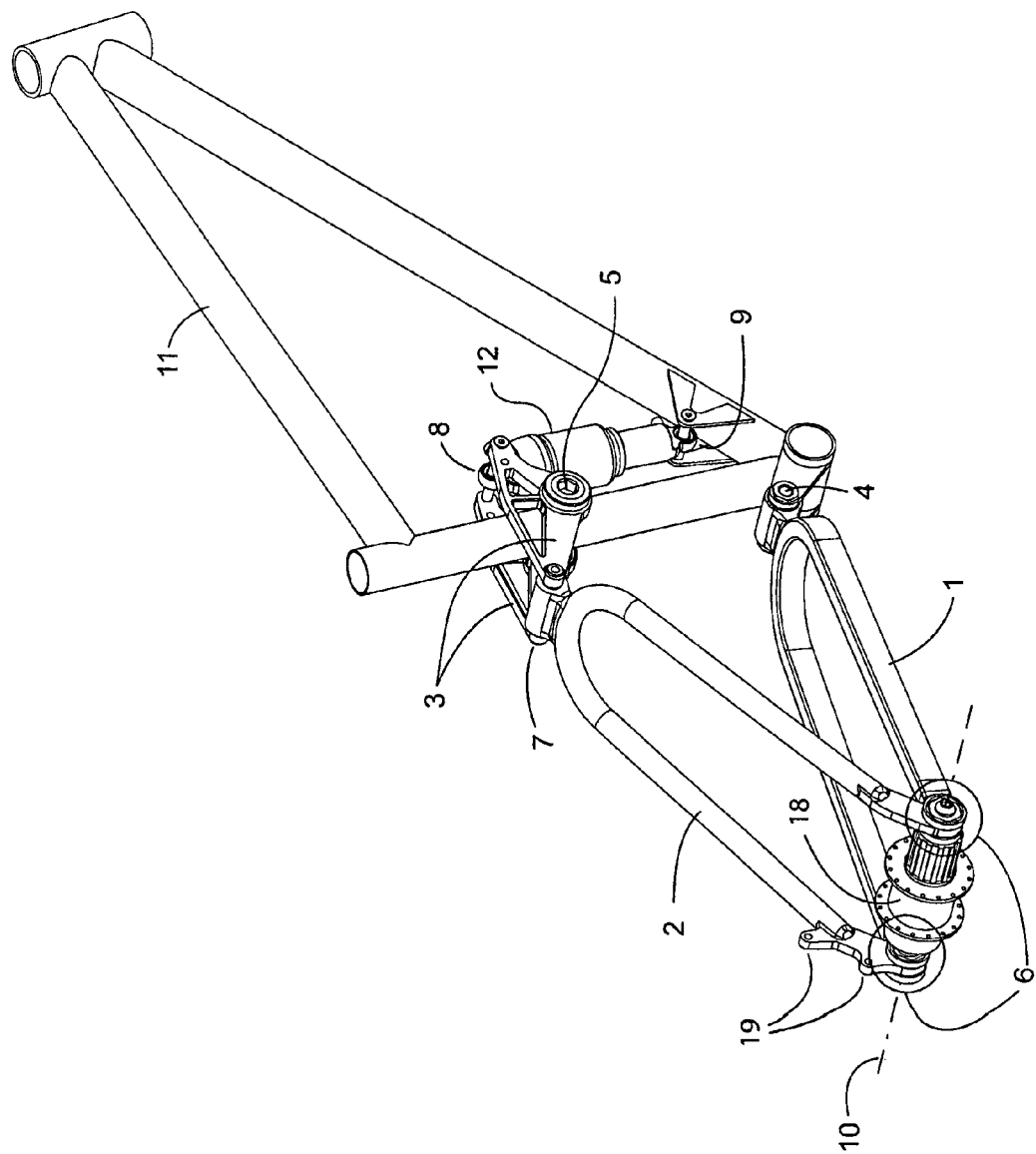
FIG. 5 shows a three dimensional view of a bicycle using the wheel suspension system shown in FIG. 2 and FIG. 4.

FIG. 5 presents a design as shown in FIGS. 2 and 4 for a suspension according to certain embodiments of the current invention via a three-dimensional view. FIG. 5 shows a representation of a frame structure and a suspension of the invention that could be used in a bicycle application. Shown in FIG. 5 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); rear hub (18); brake mount (19). A frame 11 provides the structure for the vehicle. The frame 11 depicts a tubular structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. In the embodiment presented in FIG. 5, the wheel link fixed pivot 4 comprises a clevis that is a structural component of the frame 11, and a hitch to be received by the clevis, where the hitch is a structural component of the wheel link 1. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. The rear hub 18 is a structural component of the rear wheel 17 shown in FIGS. 1, 2, 3, and 4. The rear hub 17 and rear wheel 17 share a wheel rotation axis 10 which is concentrically located to the wheel link floating pivot 6. The wheel floating link pivot 6 pivotally connects the wheel link 1 to a brake link 2. In the embodiment presented in FIG. 5, the wheel link floating pivot 6 comprises a pair of clevis that is are structural components of wheel link 1, and a pair of hitches to be received by the devises, where the hitches are structural components of the brake link 2. A brake caliper or cantilever brake or V-brake is attached to the brake link 2 so that an operator can slow the vehicle. In the embodiment presented in FIG. 5, a disc brake caliper can be bolted to a brake mount 19. The disc brake caliper will clamp on a disc brake rotor that is attached to the rear hub so that braking force can travel through the hub, through spokes or a wheel, to a tire and be transferred to the ground. Another design for the brake system is to use cantilever brakes or V-Brakes, where the brakes are mounted to the brake link 2 via posts that project from the brake link. The cantilever brakes or V-brakes then use a pad that can be clamped onto the wheel and slow the wheel down. Force from the brake will be transferred directly into the brake link 2, and the brake link 2 will transmit force to the frame 11 via the control link 3 and wheel link 1. In the embodiment presented in FIG. 5, the control link 3 is shown as two separate parts that together control the brake link 2 movements. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The control link 3 is attached to a shock absorber 12 via a first shock pivot 8. The shock absorber 12 is mounted to the frame 11 via a second shock pivot 9.

Figure 6:
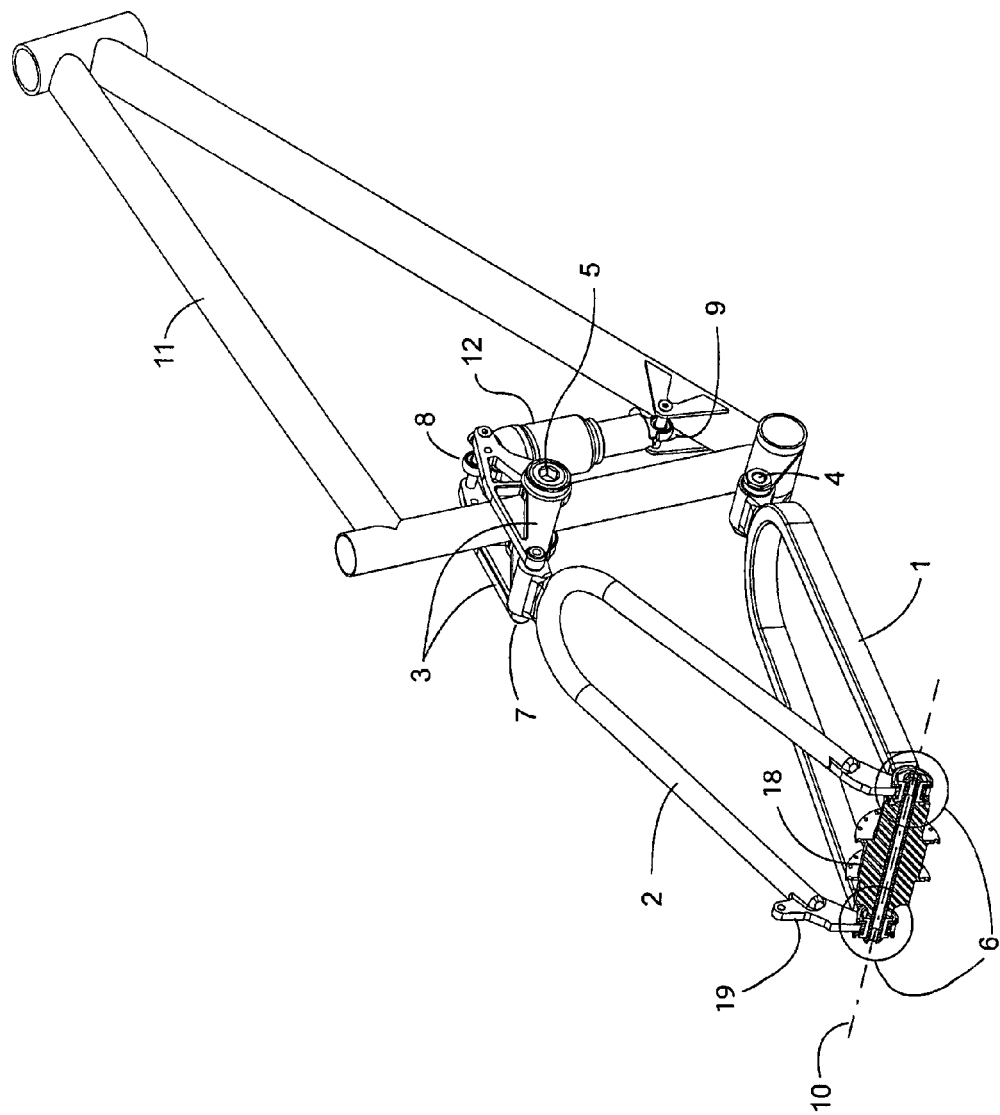
FIG. 6 shows a three dimensional view of a bicycle using the wheel suspension system shown in FIG. 2, FIG. 4, and FIG. 5, with a cutaway view of a critical area.

FIG. 6 presents a design as shown in FIGS. 2, 4, and 5 for a suspension according to certain embodiments of the current invention via a three-dimensional view. FIG. 6 shows a representation of a frame structure and a suspension of the invention that could be used in a bicycle application. Shown in FIG. 6 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); rear hub (18); brake mount (19). A cutaway view of the rear hub 18 and wheel link floating pivot 6 is shown for locational purposes for reference when viewing FIG. 7.

Figure 7:
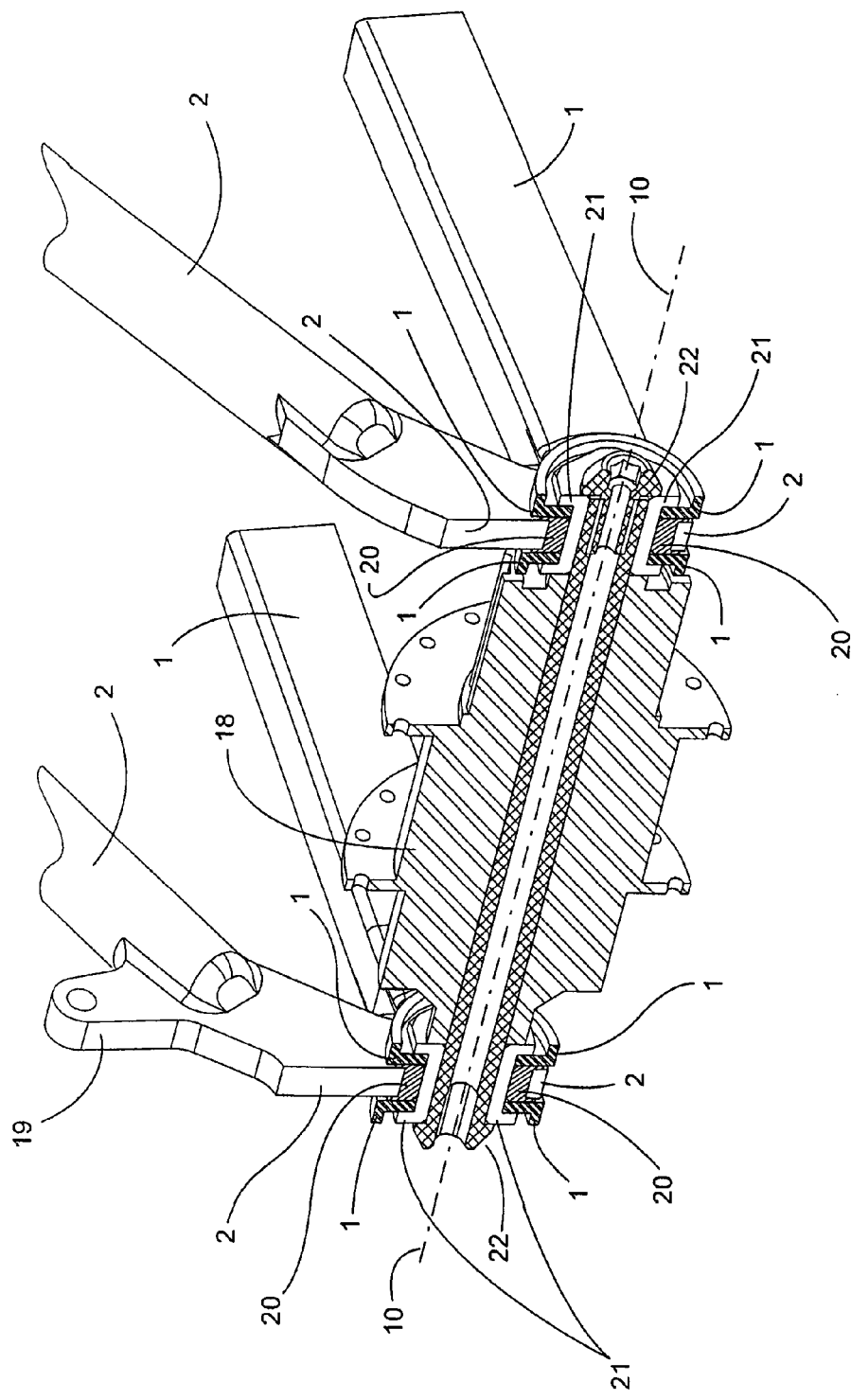
FIG. 7 shows a three dimensional cutaway view of a wheel link pivot of a bicycle using the wheel suspension system shown in FIG. 2, FIG. 4, FIG. 5, and FIG. 6, with a cutaway view of a critical area according to certain embodiments of the invention.

FIG. 7 shows a three-dimensional cutaway view of a wheel link floating pivot 6 as shown in FIGS. 2, 4, 5 and 6 for a suspension according to certain embodiments of the current invention. FIG. 7 shows a representation of a frame structure and a suspension of the invention that could be used in a bicycle application. Shown in FIG. 7 are the following: wheel link (1); brake link (2); wheel rotation axis (10); rear hub (18);

brake mount (19); pivot bearing (20); pivot axle (21); thru axle (22). Certain embodiments of the wheel link floating pivot 6 can comprise a pivot bearing 20, which allows for the independent rotation of the brake link 2 and wheel link 1 around a hub rotation axis 10. The rotation of the wheel link 1 and brake link 2 can be concentric to the hub rotation axis 10. A pivot bearing 20 can be a singular or multiple of a bushing, a DU bushing, a DX bushing, an IGUS bushing, a bearing, a ball bearing, a needle bearing, a roller bearing, a flexure, or other components intended to allow independent movement of the wheel link 1 and brake link 2 in at least one degree of freedom. A pivot axle 21 acts as a bearing surface for the pivot bearing 20. The pivot axle 21 can comprise singular or multiple parts. The pivot axle 21 can have a hole through it where it can receive a thru axle 22. The thru axle 22 can comprise singular or multiple parts. The thru axle 22 can be used to mount the rear hub 18 concentric to the wheel link floating pivot 6, yet still allow removal of the rear hub 18 for convenience. A thru axle 22 can comprise a solid axle, a thru axle, a hollow axle, a QR, a quick release, a skewer, a quick release skewer, a through bolt, or other components intended to allow rear hub 18 rotation around a wheel rotation axis 10. The rear hub 18 is shown as a solid part for simplicity of illustration, where in reality it rotates on ball bearings that allow independent rotation of the rear hub 18 and rear wheel in relation to the thru axle 22 and concentric to the wheel rotation axis 10. A disc brake rotor can be attached to the rear hub 18 so that braking force can travel through the rear hub 18, through spokes and or a wheel, to a tire and be transferred to the ground.

Figure 8:
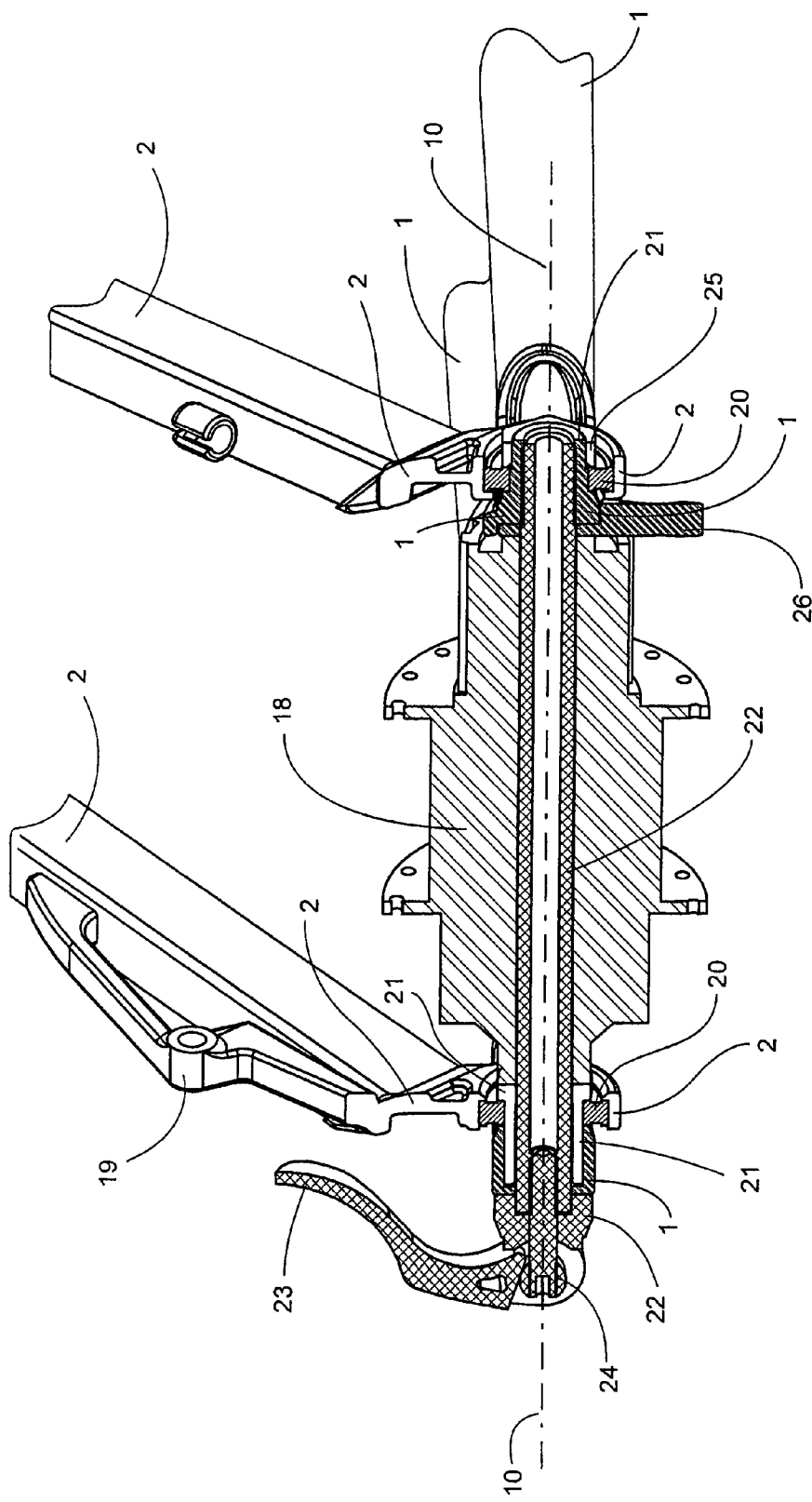
FIG. 8 shows a three dimensional cutaway view of a wheel link pivot of a bicycle using the wheel suspension system shown in FIG. 2, FIG. 4, and FIG. 5, with a cutaway view of a critical area according to certain embodiments of the invention.

FIG. 8 shows a three-dimensional cutaway view of a wheel link floating pivot 6 for a suspension according to certain embodiments of the current invention. FIG. 8 shows a representation of a frame structure and a suspension of the invention that could be used in a bicycle application. Shown in FIG. 8 are the following: wheel link (1); brake link (2); wheel rotation axis (10); rear hub (18); brake mount (19); pivot bearing (20); pivot axle (21); thru axle (22); quick release lever (23); quick release mechanism (24); pivot axle nut (25); derailleur hanger (26). Certain embodiments of the wheel link floating pivot 6 can comprise a pivot bearing 20, which allows for the independent rotation of the brake link 2 and wheel link 1 around a hub rotation axis 10. The rotation of the wheel link 1 and brake link 2 can be concentric to the hub rotation axis 10. A pivot bearing 20 can be a singular or multiple of a bushing, a DU bushing, a DX bushing, an IGUS bushing, a bearing, a ball bearing, a needle bearing, a roller bearing, a flexure, or other components intended to allow independent movement of the wheel link 1 and brake link 2 in at least one degree of freedom. A ball bearing configuration is shown in FIG. 8, where ball bearings are used for the pivot bearing 20. The pivot bearing 20 and the configuration illustrated in FIG. 8 could also alternatively or additionally use a bushing, a DU bushing, a DX bushing, an IGUS bushing, a bearing, a ball bearing, a needle bearing, a roller bearing, a flexure, a heim joint, a journal bearing, a tapered roller bearing, or other components intended to allow independent movement of the wheel link 1 and brake link 2 in at least one degree of freedom. A pivot axle 21 acts as a bearing surface for the pivot bearing 20. The pivot axle 21 can comprise singular or multiple parts. The pivot axle 21 can be a removable part as shown on the brake side in FIG. 8, or the pivot axle 21 can be integrated into a link, such as a brake link 2 or a wheel link 1 as shown on the drive side in FIG. 8. The pivot axle 21 can have a hole through it where it can receive a thru axle 22. A pivot axle nut 25 is used to concurrently affix the brake link 2 and pivot bearing 20 to the pivot axle 21 and wheel link 1. A derailleur hanger 26 is used to attach a derailleur drivetrain component to a bicycle and can be a removable part as shown in the current embodiment. In certain other embodiments, a derailleur hanger 26 can be integrated with a wheel link 1 or a brake link 2. A brake mount 19 can be used to attach a brake to a brake link 2. The thru axle 22 can comprise singular or multiple parts. The thru axle 22 can be used to mount the rear hub 18 concentric to the wheel link floating pivot 6, yet still allow removal of the rear hub 18 for convenience. A thru axle 22 can comprise a solid axle, a thru axle, a hollow axle, a QR, a quick release, a skewer, a quick release skewer, a through bolt, or other components intended to allow rear hub 18 rotation around a wheel rotation axis 10. A quick release thru axle in certain embodiments can comprise a quick release lever 23, and or a quick release mechanism 24. The quick release lever 23 is a mechanical lever that can be used to provide clamping force through a quick release mechanism 24 to clamp the rear hub 18 between the floating pivots 6 and or between a wheel link 1, brake link 2, pivot axle 21 or combination of wheel link 1 and brake link 2 and pivot axle 21. A quick release mechanism can comprise a cam, a pivot, a taper, a thread, a bearing, a bushing, or other mechanical devices intended to develop a clamping force axial with the wheel rotation axis 10. The thru axle 22 is connected to the wheel link 1 via a threaded connection on the drive (right) side. The thru axle 22 is screwed into the wheel link 1 on the drive side and when snug a quick release mechanism 24 is used to axially fix the hub 18. The rear hub 18 is shown as a solid part for simplicity of illustration, where in reality it rotates on ball bearings that allow independent rotation of the rear hub 18 and rear wheel in relation to the thru axle 22 and concentric to the wheel rotation axis 10. A disc brake rotor can be attached to the rear hub 18 so that braking force can travel through the rear hub 18, through spokes and or a wheel, to a tire and be transferred to the ground.

Figure 9:
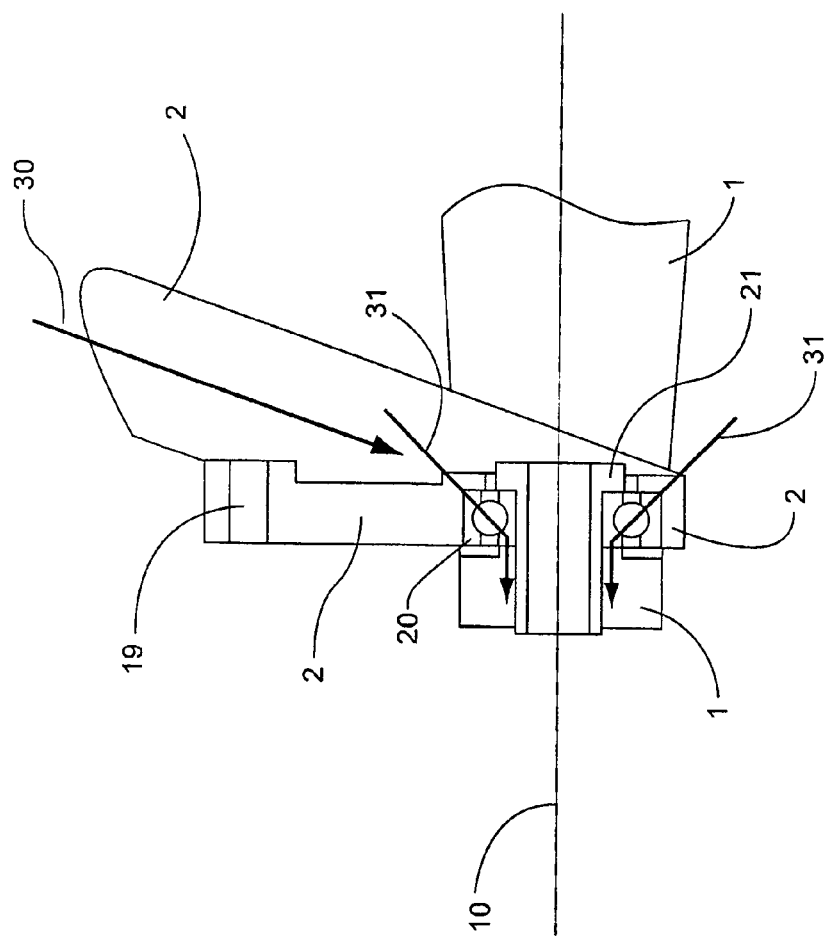
FIG. 9 shows a two dimensional cutaway view of a wheel link pivot of a bicycle using the wheel suspension system shown in FIG. 2, FIG. 4, and FIG. 5, with a cutaway view of a critical area according to certain embodiments of the invention.

FIG. 9 shows a two-dimensional rear sectional view of a wheel link floating pivot 6 for a suspension according to certain embodiments of the current invention. FIG. 9 shows a representation of a frame structure and a suspension of the invention that could be used in a bicycle application. Shown in FIG. 9 are the following: wheel link (1); brake link (2); wheel rotation axis (10); brake mount (19); pivot bearing (20); pivot axle (21); compression force (30); compression force distribution (31). Certain embodiments of the wheel link floating pivot 6 can comprise a pivot bearing 20, which allows for the independent rotation of the brake link 2 and wheel link 1 around a hub rotation axis 10. The rotation of the wheel link 1 and brake link 2 can be concentric to the hub rotation axis 10. A pivot bearing 20 can be a singular or multiple of a bushing, a DU bushing, a DX bushing, an IGUS bushing, a bearing, a ball bearing, a needle bearing, a roller bearing, a flexure, or other components intended to allow independent movement of the wheel link 1 and brake link 2 in at least one degree of freedom. A ball bearing configuration is shown in FIG. 9, where ball bearings are used for the pivot bearing 20. The pivot bearing 20 and the configuration illustrated in FIG. 9 could also alternatively or additionally use a bushing, a DU bushing, a DX bushing, an IGUS bushing, a bearing, a ball bearing, a needle bearing, a roller bearing, a flexure, a heim joint, a journal bearing, a tapered roller bearing, or other components intended to allow independent movement of the wheel link 1 and brake link 2 in at least one degree of freedom. A pivot axle 21 acts as a bearing surface for the pivot bearing 20. The pivot axle 21 can comprise singular or multiple parts. The pivot axle 21 can be a removable part as shown on the brake side in FIG. 9, or the pivot axle 21 can be integrated into a wheel link 1 or brake link 2. The pivot axle 21 can have a hole through it where it can receive a thru axle 22. A brake mount 19 can be used to attach a brake to a brake link 2. The structural configuration presented in FIG. 9 presents several useful embodiments that improve performance of the system without a gain in cost. A brake link 2 in a bicycle can be loaded in compression during suspension compression. A brake link 2 can be constructed so that the brake link 2 is angled so that the end of the brake link 2 nearest to the wheel link floating pivot 6 is farther from the center plane of the frame than the other end of the brake link 2. During suspension compression, the compression force 30 pushes downward and outward, trying to push the floating pivots 6 or floating ends of the wheel link 1 away from each other. Compression force 30 is transmitted from the brake link 2 into the pivot bearing 20. The compression force 30 is shown being transmitted as a compression force distribution 31 into the outer race of the pivot bearing 20, but it should be understood that the bearing could be supported in the opposite manner so that the compression force distribution 31 could pass through the inner race of the pivot bearing 20 to achieve the same desired end result. In certain preferred embodiments, the pivot bearing 20 is supported radially by a pivot axle 21, and axially by a wheel link 1. By supporting the pivot bearing 20 inner race axially with the wheel link 1, the possibility of failure during use through the accidental loosening of a pivot axle 21 is reduced. Alignment of the brake mount 19 with the hub 18 is also improved through the reduction of tolerance stackup presented in the current embodiment. The pivot bearing 20, in certain embodiments could be supported axially by a pivot axle 21. The pivot axle 21 installs from the hub 18 side of the wheel link 1. The brake link 2 installs on the hub 18 side of the wheel link 1. In certain embodiments, the pivot axle 21, brake link 2 could install on the side of the wheel link 1 opposite of the hub 18.

Figure 10:
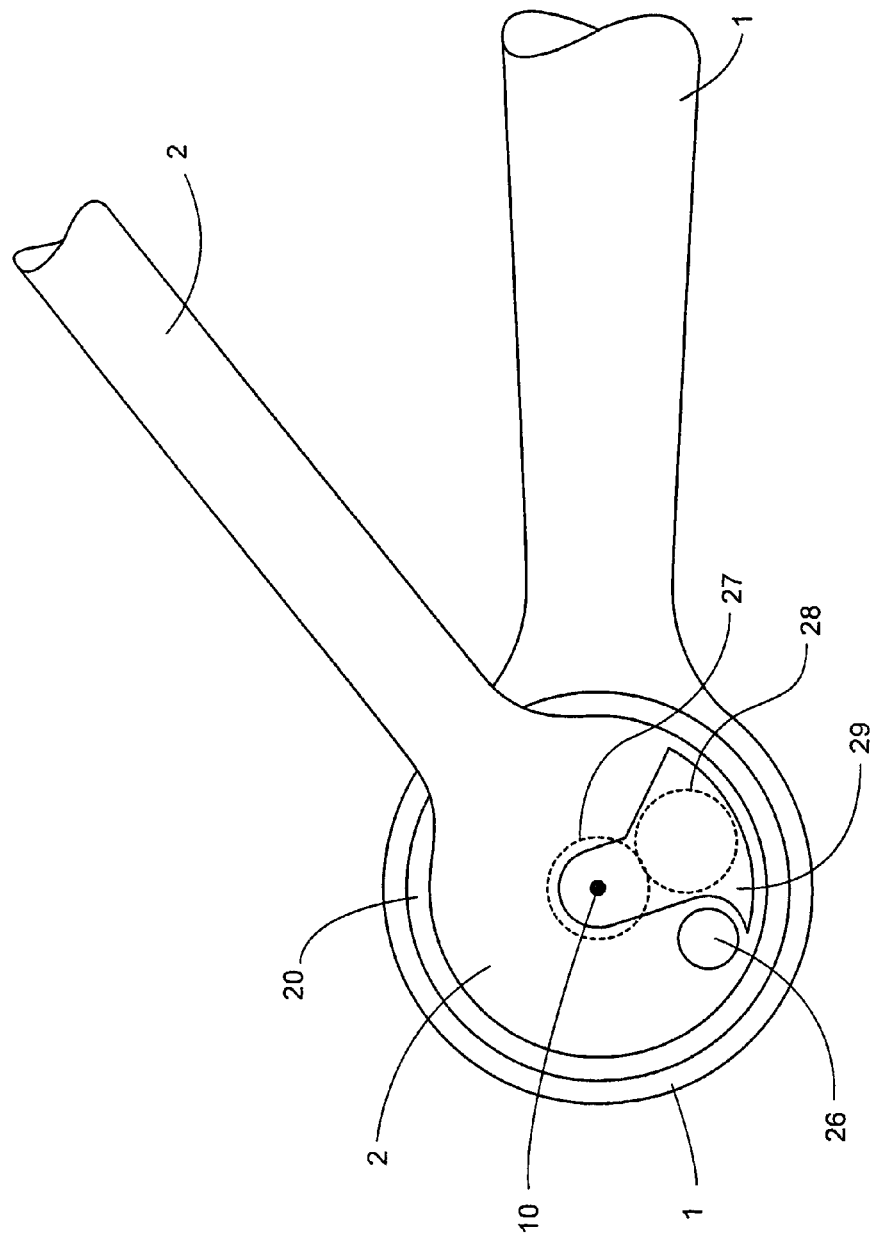
FIG. 10 shows a side view of a wheel link floating pivot useful for bicycles and quick release type wheels according to certain embodiments of the current invention.

FIG. 10 shows a side view of a wheel link floating pivot 6 for a suspension according to certain embodiments of the current invention. FIG. 10 shows a representation of a frame structure and a suspension of the invention that could be used in a bicycle application. Shown in FIG. 10 are the following: wheel link (1); brake link (2); wheel rotation axis (10); pivot bearing (20); derailleur hanger (26); axle axial stop (27); release position (28); release clearance area (29). Certain embodiments of the wheel link floating pivot 6 can comprise a pivot bearing 20, which allows for the independent rotation of the brake link 2 and wheel link 1 around a hub rotation axis 10. The rotation of the wheel link 1 and brake link 2 can be concentric to the hub rotation axis 10. A pivot bearing 20 can be a singular or multiple of a bushing, a DU bushing, a DX bushing, an IGUS bushing, a bearing, a ball bearing, a needle bearing, a roller bearing, a tapered roller bearing, a flexure, or other components intended to allow independent movement of the wheel link 1 and brake link 2 in at least one degree of freedom. In certain embodiments, a brake link 2 fixes a hub 18 and derailleur hanger 26 in position through a quick release vertical style dropout. In certain other embodiments, a wheel link 1 can fix a hub 18 and derailleur hanger 26 in position through a quick release vertical style dropout. An axle axial stop 27 is connected to a quick release mechanism, hub 18, or thru axle 22. The axle axial stop 27 provides means for quicker removal of a wheel. The axle axial stop 27 is tightened towards a hub 18 clamping a wheel link 1 or brake link 2 as illustrated in FIG. 10. The axle axial stop 27 is clamped in an upper position or clamped position when the suspension system or vehicle is in use. A release clearance area 29 is provided adjacent to the axle axial stop 27 and wheel rotation axis 10. When wheel removal is desired, clamping force on the axle axial stop 27 can be removed via the quick release mechanism or other means, and the axle axial stop 27 can be moved to the release position 28. Once the axle axial stop 27 is at the release position 28, the wheel can be freely moved in an axial direction to facilitate removal from the wheel link 1 or brake link 2.

Figure 11:
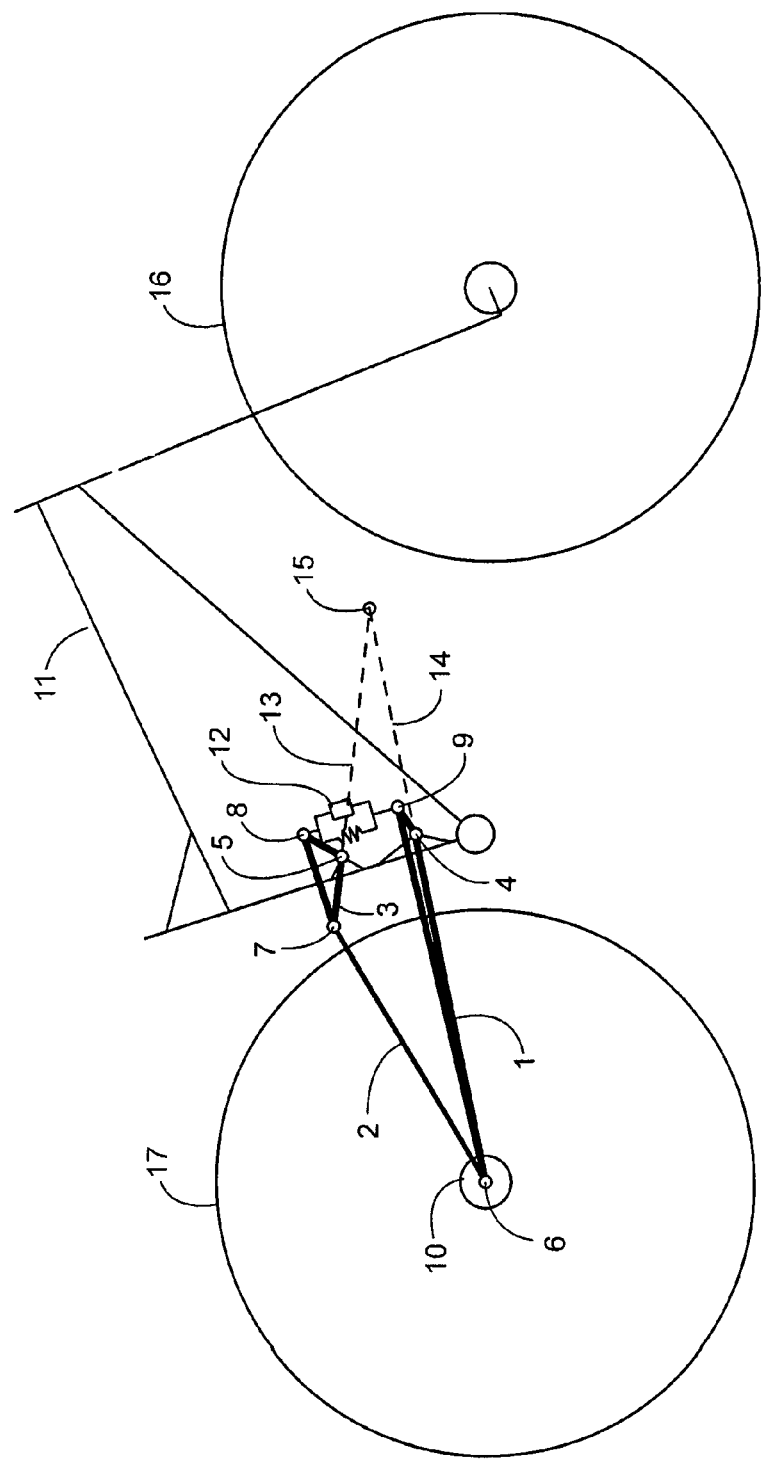
FIG. 11 shows a diagrammatical side view of a vehicle using a wheel suspension system that according to certain embodiments of the current invention. The vehicle is shown with the wheel suspension system in an uncompressed state.

FIG. 11 presents a design for a suspension according to certain embodiments of the current invention via a two-dimensional side view. Shown in FIG. 11 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 11. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 11. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The control link 3 is attached to a shock absorber 12 via a first shock pivot 8. The shock absorber 12 is mounted to the wheel link 1 via a second shock pivot 9. The movement of the first shock pivot 8 and second shock pivot 9 causes the shock absorber 12 to change length as the suspension is moved to a state of full compression. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces.

The instant force center 15 location does not govern the suspension's reaction to powered acceleration.

Figure 12:
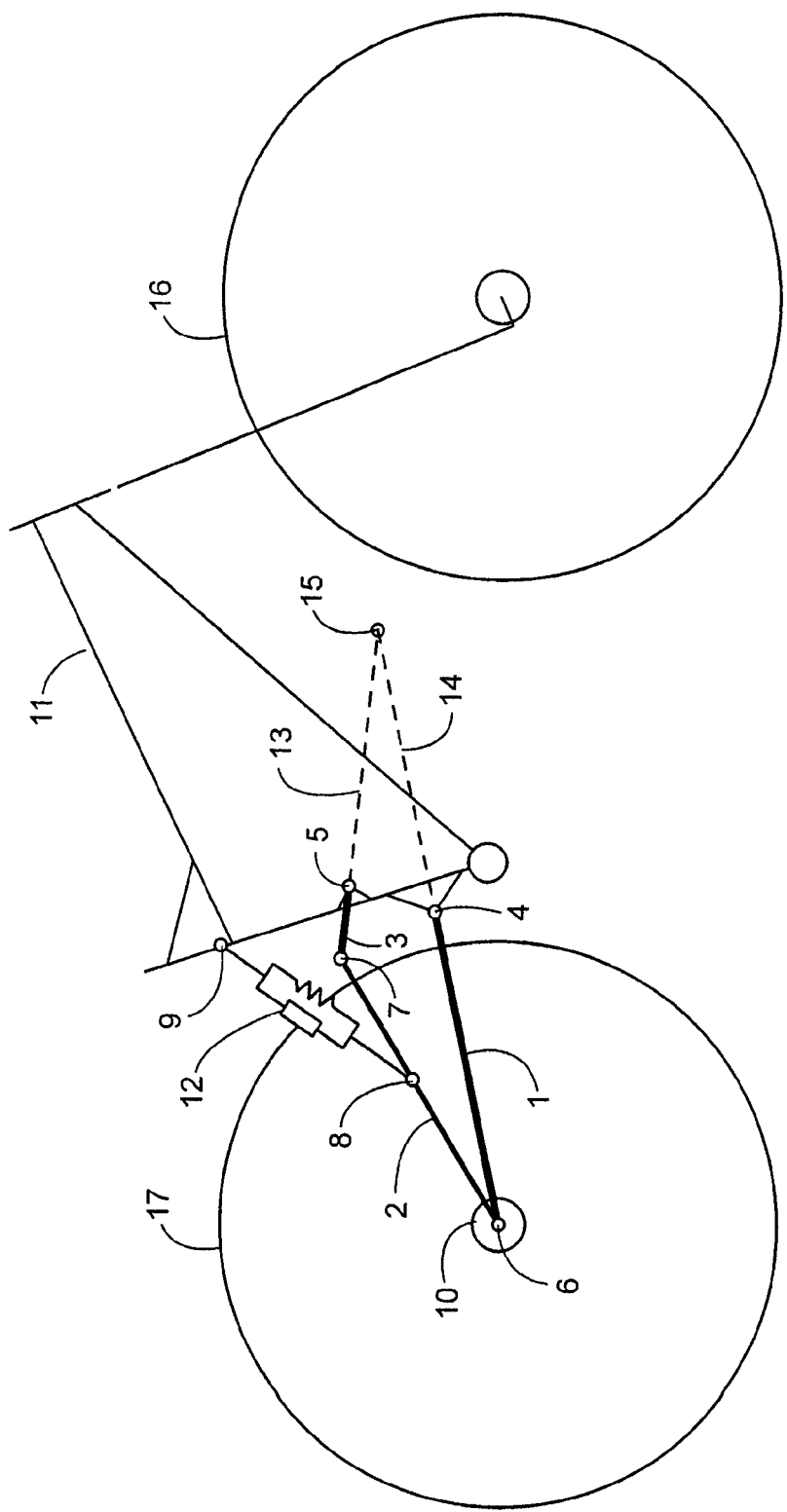
FIG. 12 shows a diagrammatical side view of a vehicle using a wheel suspension system that according to certain embodiments of the current invention. The vehicle is shown with the wheel suspension system in an uncompressed state.

FIG. 12 presents a design for a suspension according to certain embodiments of the current invention via a two-dimensional side view. Shown in FIG. 12 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 12. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 12. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The brake link 2 is attached to a shock absorber 12 via a first shock pivot 8. The shock absorber 12 is mounted to the frame 11 via a second shock pivot 9. The movement of the first shock pivot 8 and stationary location of the second shock pivot 9 causes the shock absorber 12 to change length as the suspension is moved to a state of full compression. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 13:
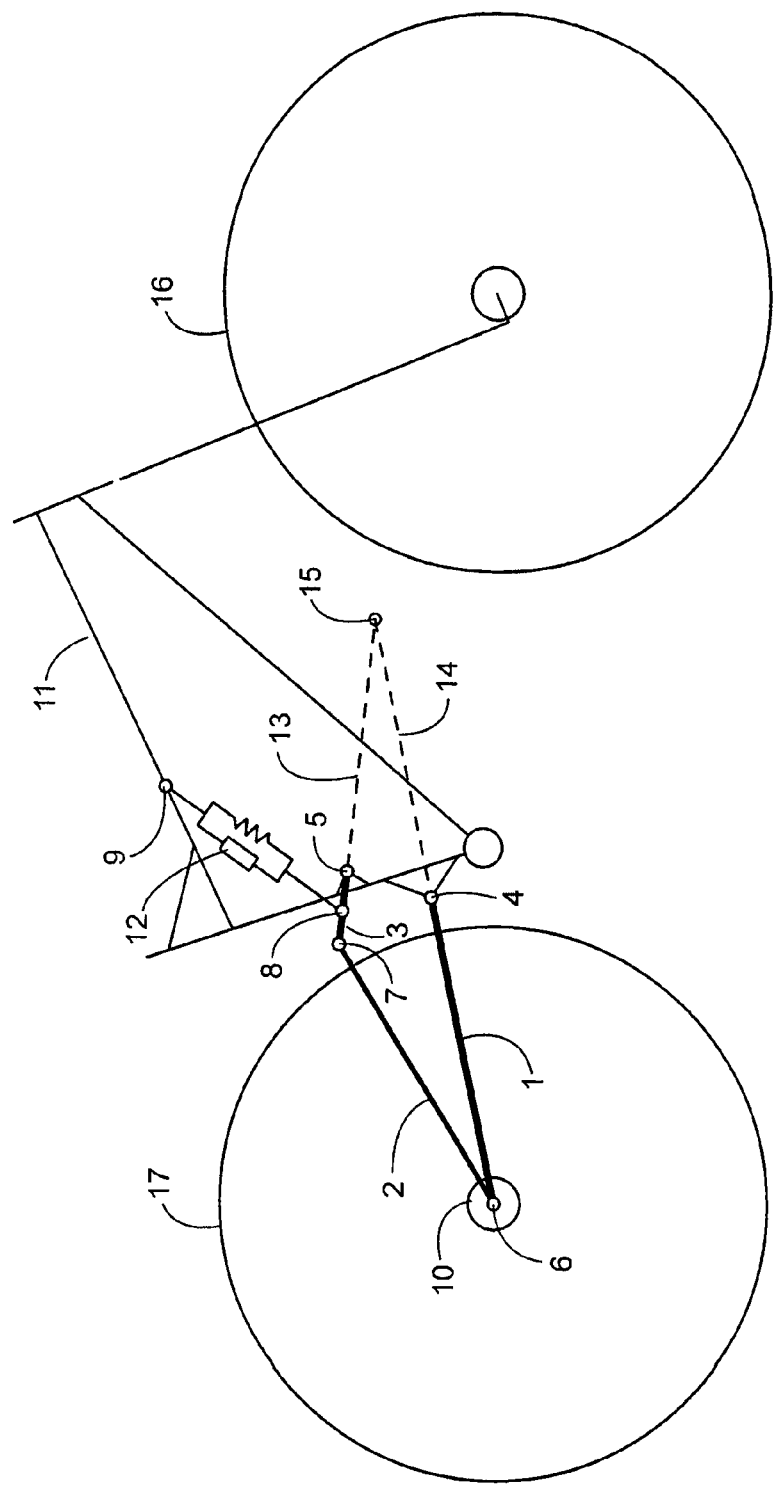
FIG. 13 shows a diagrammatical side view of a vehicle using a wheel suspension system that according to certain embodiments of the current invention. The vehicle is shown with the wheel suspension system in an uncompressed state.

FIG. 13 presents a design for a suspension according to certain embodiments of the current invention via a two-dimensional side view. Shown in FIG. 13 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 13. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 13. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The control link 3 is attached to a shock absorber 12 via a first shock pivot 8. The shock absorber 12 is mounted to the frame 11 via a second shock pivot 9. The movement of the first shock pivot 8 and stationary location of the second shock pivot 9 causes the shock absorber 12 to change length as the suspension is moved to a state of full compression. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 14:
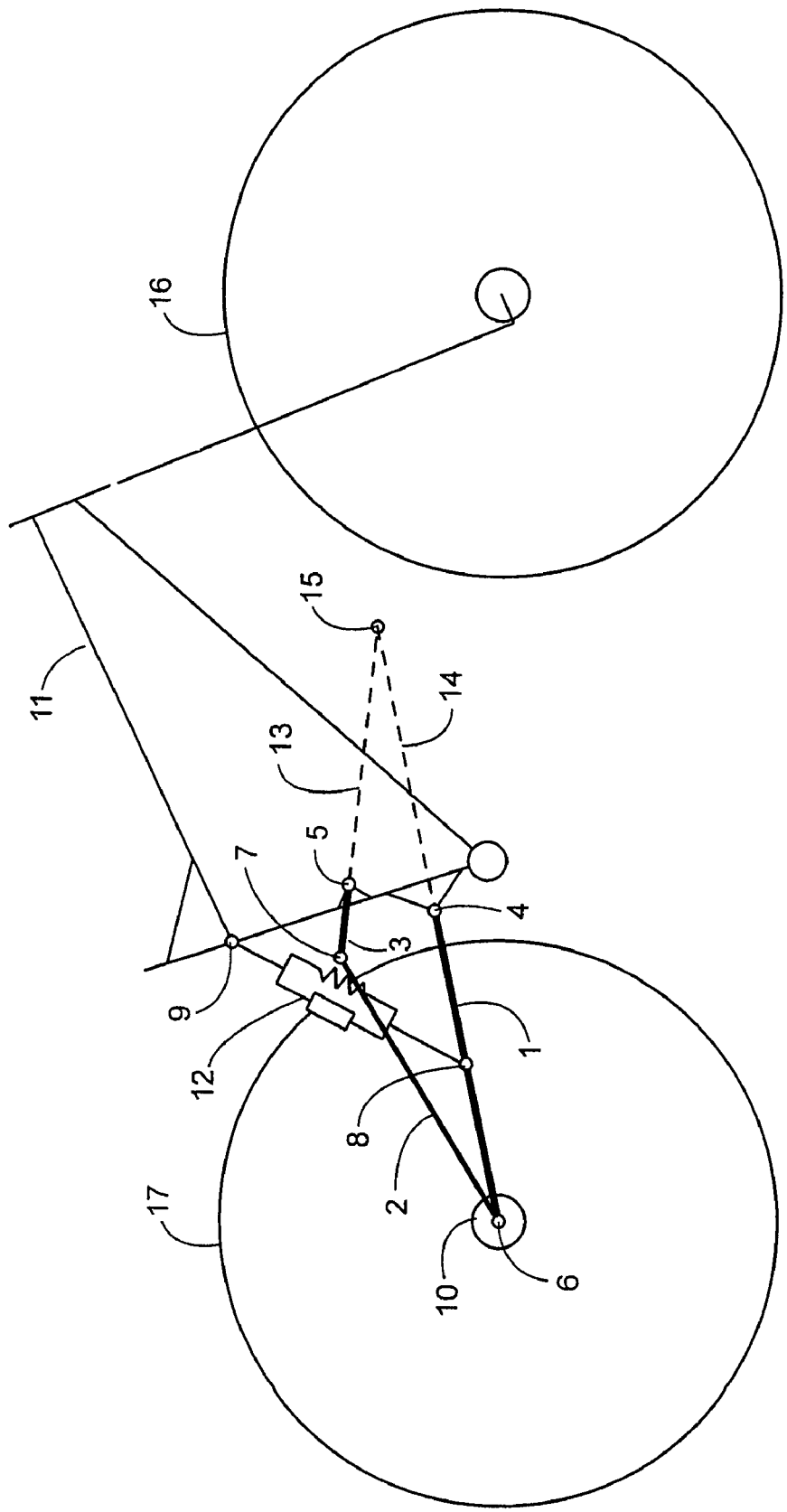
FIG. 14 shows a diagrammatical side view of a vehicle using a wheel suspension system that according to certain embodiments of the current invention. The vehicle is shown with the wheel suspension system in an uncompressed state.

FIG. 14 presents a design for a suspension according to certain embodiments of the current invention via a two-dimensional side view. Shown in FIG. 14 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 14. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 14. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The wheel link 1 is attached to a shock absorber 12 via a first shock pivot 8. The shock absorber 12 is mounted to the frame 11 via a second shock pivot 9. The movement of the first shock pivot 8 and stationary location of the second shock pivot 9 causes the shock absorber 12 to change length as the suspension is moved to a state of full compression. The shock absorber 12 is mounted in a configuration that allows the second shock pivot 9 to mount behind a wheel link fixed pivot 4. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 15:
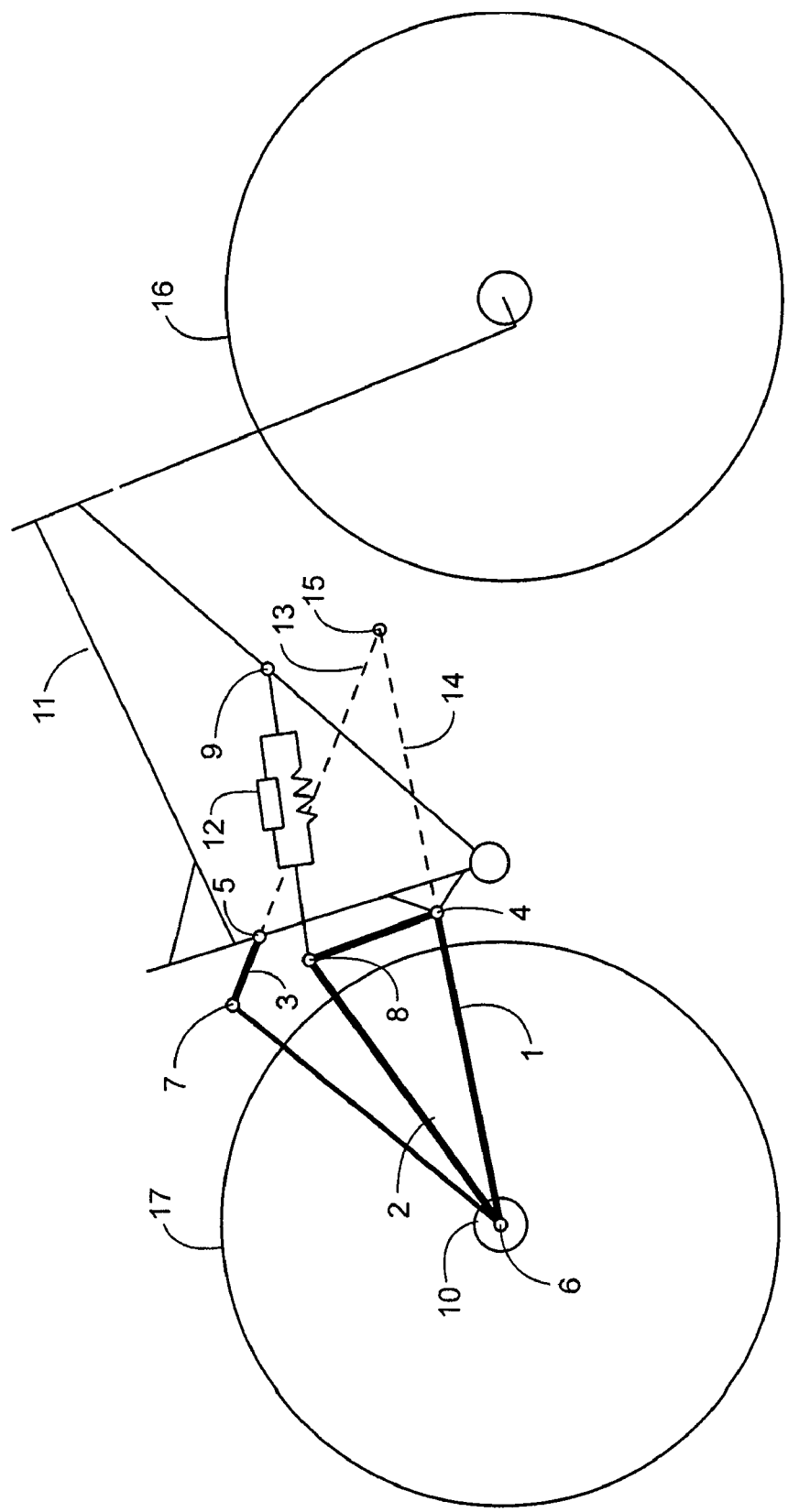
FIG. 15 shows a diagrammatical side view of a vehicle using a wheel suspension system that according to certain embodiments of the current invention. The vehicle is shown with the wheel suspension system in an uncompressed state.

FIG. 15 presents a design for a suspension according to certain embodiments of the current invention via a two-dimensional side view. Shown in FIG. 15 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 15. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 15. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The wheel link 1 is attached to a shock absorber 12 via a first shock pivot 8. The shock absorber 12 is mounted to the frame 11 via a second shock pivot 9. The shock absorber 12 is mounted in a configuration that allows the second shock pivot 9 to mount in front of a wheel link fixed pivot 4. The movement of the first shock pivot 8 and stationary location of the second shock pivot 9 causes the shock absorber 12 to change length as the suspension is moved to a state of full compression. A control link force line 13 projects through the control link fixed pivot 5 and control link floating pivot 7. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 16:
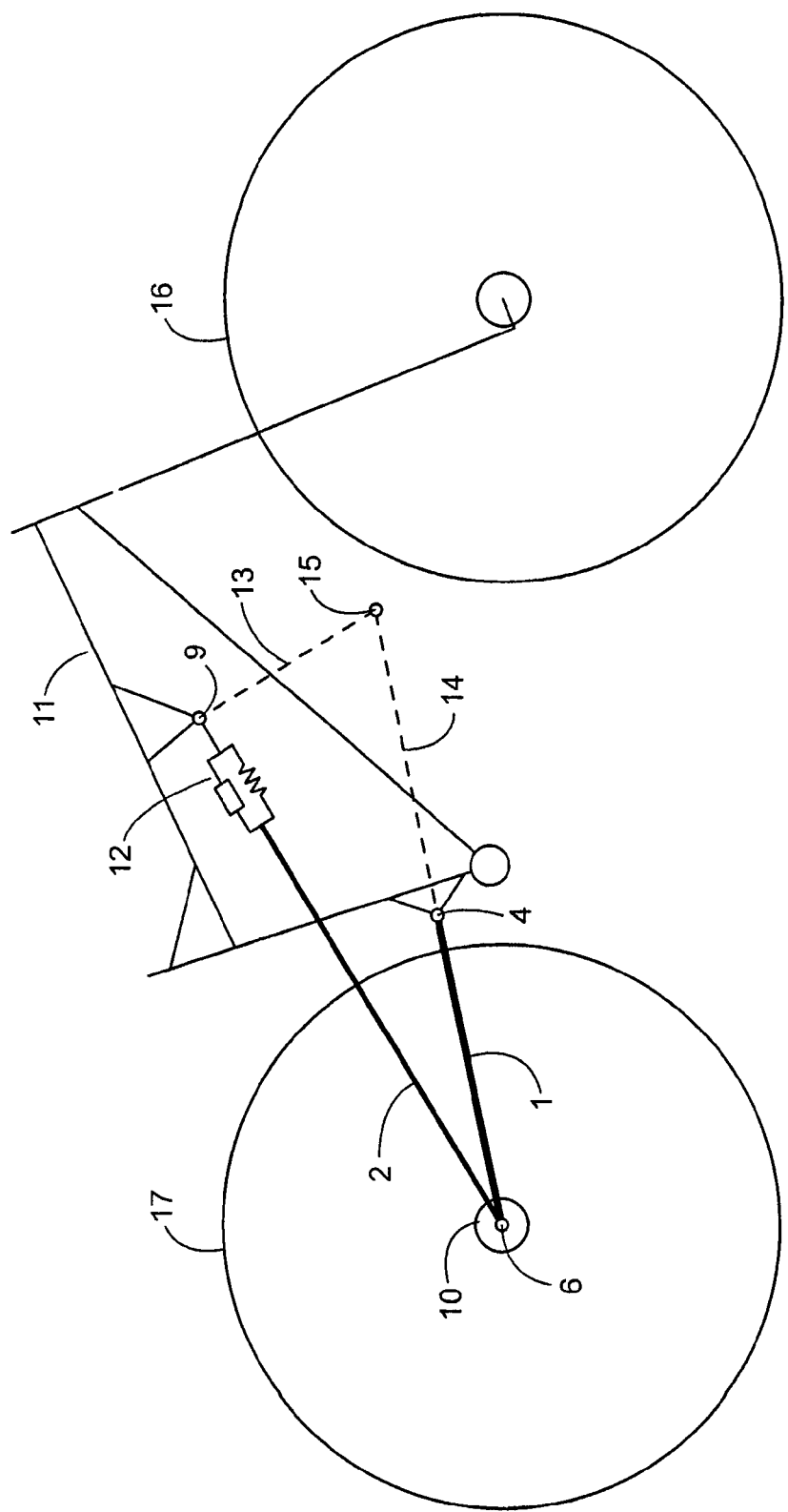
FIG. 16 shows a diagrammatical side view of a vehicle using a wheel suspension system that according to certain embodiments of the current invention. The vehicle is shown with the wheel suspension system in an uncompressed state.

FIG. 16 presents a design for a suspension according to certain embodiments of the current invention via a two-dimensional side view. Shown in FIG. 16 are the following: wheel link (1); brake link (2); wheel link fixed pivot (4); wheel link floating pivot (6); second shock pivot (9); wheel rotation axis (10); frame (11); shock absorber (12); control link force line (13); wheel link force line (14); instant force center (15); front wheel (16); rear wheel (17). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 16. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 16. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. According to certain embodiments of the current invention, a shock absorber 12 functions a control link 3. A shock absorber 12, in some embodiments, functions in the same manner as an infinitely long control link 3 would. Force from the brake will be transferred directly into the brake link 2, and the brake link 2 will transmit force to the frame 11 via the shock absorber 12 and wheel link 1. The brake link 2 is fixedly attached to a shock absorber 12 which allows for brake link articulation in at least one degree of freedom as defined by the wheel link floating pivot 6 and the second shock pivot 9. The shock absorber 12 is mounted to the frame 11 via a second shock pivot 9. Force is transmitted through the links and shock absorber 12 via the link fixed and floating pivots 4, and 6, and second shock pivot 9. The brake link 2 can consist of a single sided strut that passes next to only one side of a rear wheel 17, or a double sided strut that passes next to both sides of a rear wheel 17. The second shock pivot 9 forces the brake link 2 to move in a prescribed manner. Brake link 2 and stationary location of the second shock pivot 9 causes the shock absorber 12 to change length as the suspension is moved to a state of full compression. A control link force line 13 projects in a perpendicular direction to the brake link 2 through the second shock pivot 9. A wheel link force line 14 projects through the wheel link fixed pivot 4 and the wheel link floating pivot 6. The intersection of the control link force line 13 and wheel link force line 14 is a measurable location called the instant force center 15. The tactical location of the instant force center 15 can be used to control how the suspension system reacts to braking forces. The instant force center 15 location does not govern the suspension's reaction to powered acceleration.

Figure 17:
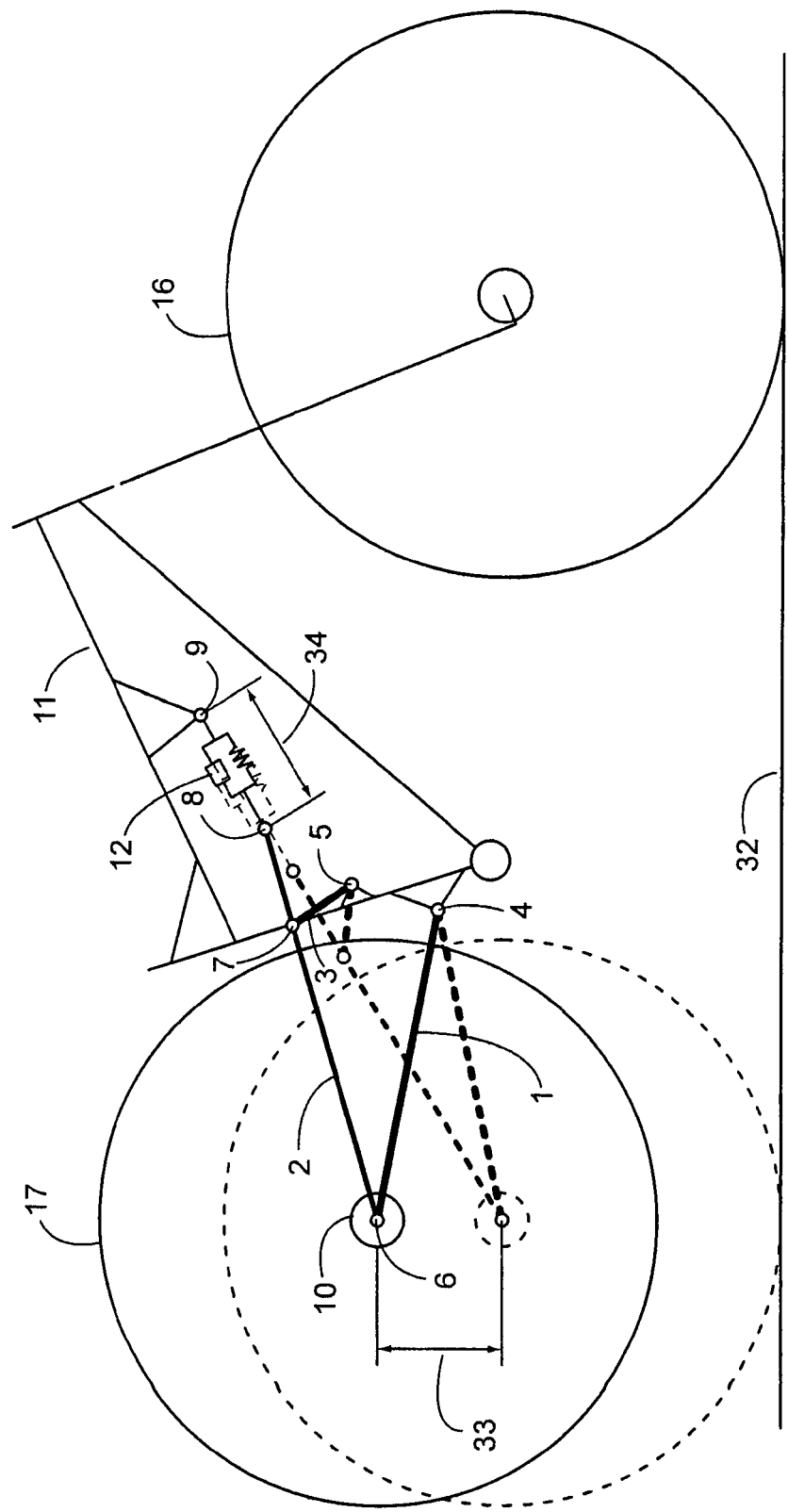
FIG. 17 shows a diagrammatical side view of a vehicle using a wheel suspension system according to certain embodiments of the current invention. The vehicle is shown with the wheel suspension system in an uncompressed and compressed state.

FIG. 17 presents a design for a suspension according to certain embodiments of the current invention via a two-dimensional side view. Shown in FIG. 17 are the following: wheel link (1); brake link (2); control link (3); wheel link fixed pivot (4); control link fixed pivot (5); wheel link floating pivot (6); control link floating pivot (7); first shock pivot (8); second shock pivot (9); wheel rotation axis (10); frame (11); shock absorber (12); front wheel (16); rear wheel (17); ground plane (32); incremental vertical compression distance (33); shock absorber length (34). A frame 11 provides the structure for the vehicle. The frame 11 is shown as a series of lines that depict a structural layout for a vehicle such as a bicycle or motorcycle. The frame 11 provides a support or mounting location for powertrain components such as; engines, gears, transmissions, and fuel tanks; suspension parts such as forks, rear suspension and front suspension; operator interfaces such as handlebars and seats; and accessories such as water bottles and batteries for lights. A wheel link 1 is mounted to the frame 11 via a wheel link fixed pivot 4. The wheel link fixed pivot 4 is a mounting location which allows for wheel link 1 articulation in at least one degree of freedom. The wheel link fixed pivot 4 and all other pivoting locations are shown as small circles in FIG. 17. The wheel link 1 holds a wheel link fixed pivot 4 and a wheel link floating pivot 6 at a fixed distance apart from each other. The wheel link 1 allows the rear wheel 17 to articulate around the wheel link fixed pivot 4 at a constant or close to constant radius. Two wheels, a front wheel 16 and a rear wheel 17 are shown in FIG. 17. The rear wheel 17 has a wheel rotation axis 10 which is concentrically located to the wheel link floating pivot 6. The wheel floating link pivot 6 pivotally connects the wheel link 1 to a brake link 2. A brake caliper or cantilever brake or V-brake is attached to the brake link 2 so that an operator can slow the vehicle. The rear wheel 17 will have a disc brake rotor or rotary braking surface attached so that the brake caliper or cantilever brake can slow the rear wheel 17. Force from the brake will be transferred directly into the brake link 2, and the brake link 2 will transmit force to the frame 11 via the control link 3 and wheel link 1. Force is transmitted through the links via the link fixed and floating pivots 4, 5, 6, and 7. The brake link 2 can consist of a single sided strut that passes next to only one side of a rear wheel 17, or a double sided strut that passes next to both sides of a rear wheel 17. A control link 3 is attached to the frame 11 at a control link fixed pivot 5. The control link fixed pivot 5 is a mounting location which allows for control link 3 articulation in at least one degree of freedom. The brake link 2 is attached to a control link 3 via a control link floating pivot 7. The control link floating pivot 7 forces the brake link 2 to move in a prescribed manner. The brake link 2 is attached to a shock absorber 12 via a first shock pivot 8. The shock absorber 12 is mounted to the frame 11 via a second shock pivot 9. The movement of the first shock pivot 8 and stationary location of the second shock pivot 9 causes the shock absorber 12 to change length as the suspension is moved to a state of full compression. This length is called the shock absorber length 34 and is measured as the shortest distance between the first shock pivot 8 and the second shock pivot 9. As a wheel is compressed, incremental vertical compression distance 33 measurements are taken. Incremental vertical compression distance 33 is measured perpendicular to gravity and a ground plane 32. These incremental vertical measurements are called the incremental vertical compression distance 33. A shock absorber length 34 can be changed by a wheel link 1, and/or brake link 2, and/or control link 3 movements as the suspension compresses. At each incremental vertical compression distance 33 measurement, a shock absorber length 34 measurement is taken. The relationship between incremental vertical compression distance 33 change and shock absorber length 34 change for correlating points in the suspension's compression is called leverage ratio, leverage rate, motion ratio or motion rate.

Figure 18:
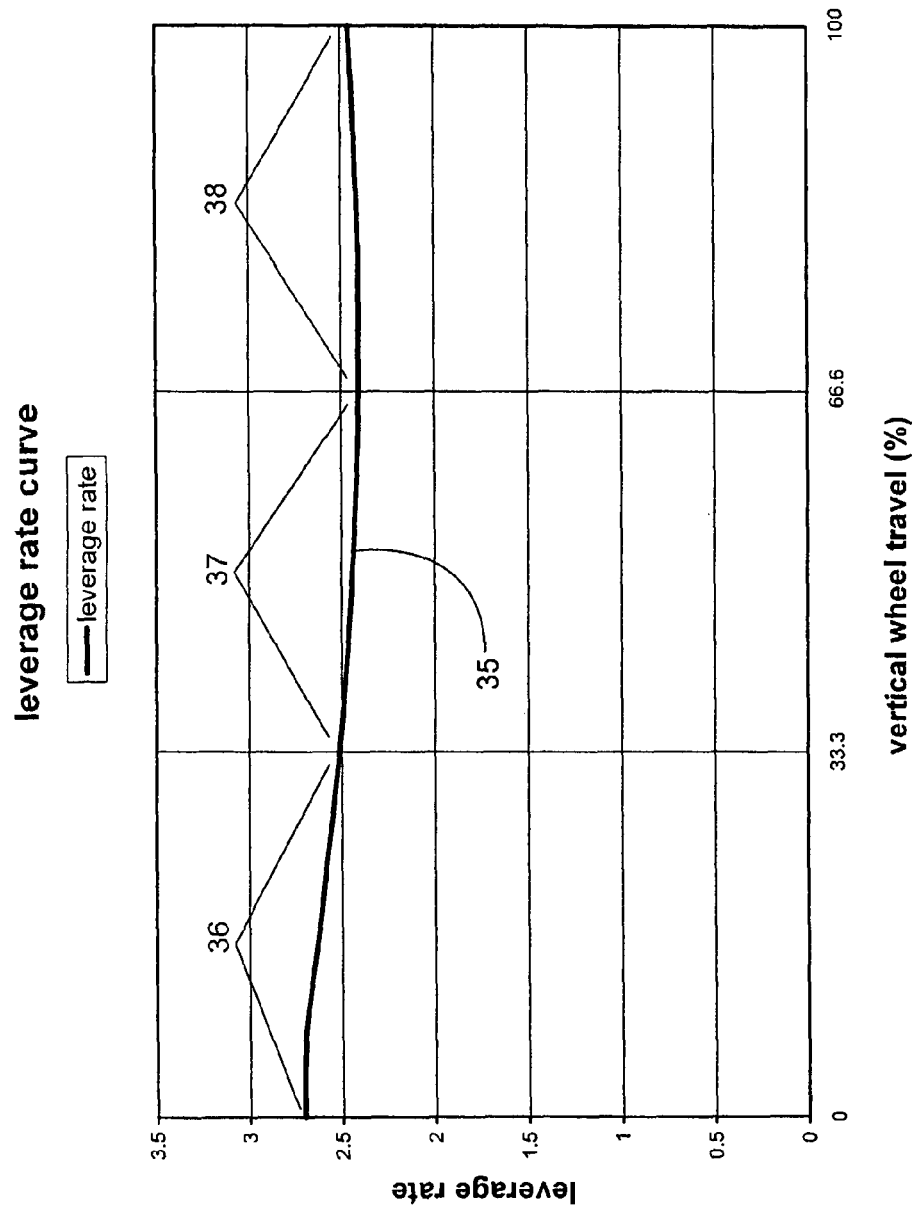
FIG. 18 shows a leverage rate curve graph according to certain embodiments of the invention.

FIG. 18 illustrates a leverage rate curve according to certain embodiments of the current invention. A leverage rate curve 35 is a graphed quantifiable representation of leverage rate versus wheel compression distance or percentage of full compression. Wheel compression distance or vertical wheel travel is measured perpendicular to gravity with the initial 0 percent measurement taken at full suspension extension with the vehicle unladen and on even ground. As a suspension is compressed from a point of full extension to a point of full compression at a constant rate, measurements of shock absorber length are taken as the shortest distance between a first shock pivot and a second shock pivot at equal increments of shock absorber compression. When graphed as a curve on a Cartesian graph, leverage rate is shown on the Y axis escalating from the x axis in a positive direction, and vertical wheel travel is shown on the X axis escalating from the Y axis in a positive direction. Leverage rates of the current invention are designed, in certain embodiments, to achieve a desired force output at a wheel. In certain embodiments a leverage rate curve 35 can be broken down into three equal parts in relation to wheel compression distance or vertical wheel travel, a beginning ⅓, 36, a middle ⅓, 37, and an end ⅓, 38.

5.2 Wheel Links of Suspension Systems of the Invention

A suspension system of the current invention, in certain embodiments, comprises a wheel link, or two, three, four, five or more wheel links. A wheel link, in certain embodiments, is connected to a frame, a shock absorber, a first shock pivot, a second shock pivot, a wheel link floating pivot and/or a wheel link fixed pivot. In certain embodiments, a wheel link is located below (in other words, closer to the ground than) a brake link, a control link floating pivot, a control link, a first shock pivot, a shock absorber, an instant force center and/or a second shock pivot, or any one or more of these components, of a suspension system according to the invention when the suspension is uncompressed and the vehicle is on even ground when even ground is perpendicular to gravity. In certain other embodiments, a suspension system of the invention comprises a wheel link that is the same length or about the same length as a brake link of that suspension system. In certain other embodiments, a suspension system of the invention comprises a wheel link that is 5 percent or about 5 percent longer or shorter than a brake link of that suspension system, or 10 percent or about 10 percent longer or shorter, or 20 percent or about 20 percent longer or shorter, or 30 percent or about 30 percent longer or shorter, or 5 to 20 percent longer or shorter, or 5 to 50 percent longer or shorter, or 5 to 100 percent longer or shorter, or 5 to 200 percent longer or shorter, or 5 to 500 percent longer or shorter. In certain other embodiments, a wheel link of the invention is 2 to 50 centimeters (cm) in length, or 30 to 45 cm, or 35 to 40 cm. In certain other embodiments, a suspension system of the invention comprises a wheel link that is the same diameter or about the same diameter as a brake link of that suspension system. In certain other embodiments, a suspension system of the invention comprises a wheel link that is 5 percent or about 5 percent larger or smaller in diameter than a brake link of that suspension system, or 10 percent or about 10 percent larger or smaller in diameter, or 20 percent or about 20 percent larger or smaller in diameter, or 30 percent or about 30 percent larger or smaller in diameter, or 5 to 20 percent larger or smaller in diameter. In certain other embodiments, a wheel link of the invention is 0.5 to 5 cm in diameter, or 1 to 4 cm, or 1.5 to 3 cm, or 2 to 2.5 cm.

5.3 Brake Links of Suspension Systems of the Invention

A suspension system of the current invention, in certain embodiments, comprises a brake link, or two, three, four, five or more brake links. A brake link, in certain embodiments, is connected to a wheel link floating pivot, a control link floating pivot, and/or a first shock pivot, and/or a second shock pivot. In certain embodiments, a brake link is located above (in other words, further from the ground than) a wheel link of a suspension system according to the invention when the suspension is uncompressed and the vehicle is on even ground when even ground is perpendicular to gravity. In certain embodiments, a brake link is located below (in other words, closer to the ground than) a control link floating pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain other embodiments, a suspension system of the invention comprises a brake link that is the same length or about the same length as a wheel link of that suspension system. In certain other embodiments, a suspension system of the invention comprises a brake link that is 5 percent or about 5 percent longer or shorter than a wheel link of that suspension system, or 10 percent or about 10 percent longer or shorter, or 20 percent or about 20 percent longer or shorter, or percent or about 30 percent longer or shorter, or 5 to 20 percent longer or shorter, or 5 to 50 percent longer or shorter, or 5 to 100 percent longer or shorter, or 5 to 200 percent longer or shorter, or 5 to 500 percent longer or shorter. In certain other embodiments, a brake link of the invention is 2 to 100 cm in length, or 35 to 55 cm, or 40 to 50 cm. In certain other embodiments, a suspension system of the invention comprises a brake link that is the same diameter or about the same diameter as a wheel link of that suspension system. In certain other embodiments, a suspension system of the invention comprises a brake link that is 5 percent or about 5 percent larger or smaller in diameter than a wheel link of that suspension system, or 10 percent or about 10 percent larger or smaller in diameter, or 20 percent or about 20 percent larger or smaller in diameter, or 30 percent or about 30 percent larger or smaller in diameter, or 5 to 20 percent larger or smaller in diameter. In certain other embodiments, a brake link of the invention is 0.5 to 5 cm in diameter, or 1 to 4 cm, or 1.5 to 3 cm, or 2 to 2.5 cm.

In certain other embodiments, a brake link and a wheel link of a suspension system of the invention are arranged relative to each other in a non-parallel manner when observed from side of the vehicle comprising the suspension system. In certain embodiments, a brake link and a wheel link are arranged relative to each other at an angle of 0 to 150 degrees, or 0 to 100 degrees, or 0 to 80 degrees, or 10 to 60 degrees, or 15 to 40 degrees, or 20 to 30 degrees, when observed from the side of the vehicle, while the suspension of said vehicle is uncompressed and the vehicle is on even ground when even ground is perpendicular to gravity. In certain other embodiments, a brake link passes on a side of a frame member or on two sides of a frame member.

5.4 Control Links of Suspension Systems of the Invention

A suspension system of the current invention, in certain embodiments, comprises a control link, or two, three, four, five or more control links. A control link of a suspension system of the invention, in certain embodiments, is connected to a brake link. In certain other embodiments, a control link is connected to a control link floating pivot, a brake link, a control link fixed pivot, a shock absorber, first shock pivot, and/or a second shock pivot. In certain other embodiments, a control link passes on a side of a frame member or on two sides of a frame member. In certain embodiments, a control link is located above a wheel link, a wheel link floating pivot, a wheel link fixed pivot, a first shock pivot, a shock absorber, a second shock pivot, a control link fixed pivot, and/or an instant force center, or any one or more of these components, of a suspension system according to the invention when the suspension is uncompressed and the vehicle is on even ground when even ground is perpendicular to gravity. In certain embodiments, a control link is located below a control link floating pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain other embodiments, a control link of the invention is 0.5 to 5 cm in diameter, or 1 to 4 cm, or 1.5 to 3 cm, or 2 to 2.5 cm. In certain other embodiments, a suspension system of the invention comprises a control link with a length that is 2 percent or about 2 percent of the length of a wheel link of that suspension system, or 5 percent or about 5 percent longer or shorter, or 10 percent or about 10 percent longer or shorter, or 20 percent or about 20 percent longer or shorter, or 30 percent or about 30 percent longer or shorter, or 2 to 20 percent longer or shorter, or 2 to 50 percent longer or shorter, or 2 to 100 percent longer or shorter, or 2 to 200 percent longer or shorter, or 2 to 500 percent longer or shorter. In certain other embodiments, a control link of the invention is 1 to 50 cm in length, or 2 to 25 cm, or 8 to 15 cm.

5.5 Wheel Link Fixed Pivots of Suspension Systems of the Invention

A suspension system of the current invention, in certain embodiments, comprises a wheel link fixed pivot, or two, three, four, five or more wheel link fixed pivots. In certain embodiments, a wheel link fixed pivot of a suspension system of the invention is located below a control link floating pivot, a first shock pivot, a shock absorber, a second shock pivot, a control link, a control link fixed pivot, a wheel link floating pivot, and/or an instant force center, or any one or more of these components, of a suspension system according to the invention when the suspension is uncompressed and the vehicle is on even ground when even ground is perpendicular to gravity. In certain embodiments, a wheel link fixed pivot of a suspension system of the invention is located above a second shock pivot, a wheel link floating pivot, and/or an instant force center, or any one or more of these components, of a suspension system according to the invention when the suspension is uncompressed and the vehicle is on even ground when even ground is perpendicular to gravity.

5.6 Control Link Fixed Pivots of Suspension Systems of the Invention

A suspension system of the current invention, in certain embodiments, comprises a control link fixed pivot, or two, three, four, five or more control link fixed pivots. In certain embodiments, a control link fixed pivot of a suspension system of the invention is located below a control link floating pivot, a first shock pivot, a shock absorber, a second shock pivot, a control link, a wheel link floating pivot, and/or an instant force center, or any one or more of these components, of a suspension system according to the invention when the suspension is uncompressed and the vehicle is on even ground when even ground is perpendicular to gravity. In certain embodiments, a control link fixed pivot of a suspension system of the invention is located above a second shock pivot, a wheel link floating pivot, a wheel link fixed pivot, a wheel link, a brake link, and/or an instant force center, or any one or more of these components, of a suspension system according to the invention when the suspension is uncompressed and the vehicle is on even ground when even ground is perpendicular to gravity.

5.7 Wheel Link Floating Pivots of Suspension Systems of the Invention

A suspension system of the current invention, in certain embodiments, comprises a wheel link floating pivot, or two, three, four, five or more wheel link floating pivots. In certain embodiments, a wheel link floating pivot of a suspension system of the invention is concentric with a wheel rotation axis of the vehicle, preferably the wheel rotation axis of a driven wheel, a rear wheel, a front wheel, or a suspended wheel of the vehicle. In certain other embodiments, a wheel link floating pivot is nearly concentric with a wheel rotation axis of the vehicle, preferably the wheel rotation axis of a driven wheel, a rear wheel, a front wheel, or a suspended wheel of the vehicle. A wheel link floating pivot is nearly concentric with a wheel rotation axis if the axis the pivot turns around is within 2 cm of the wheel rotation axis, or within 5 cm, or within 10 cm, or within 15 cm, or when the wheel axis and pivot axis are from 2 to 20 cm away from each other, or from 5 to 15 cm, or from 5 to 10 cm.

In certain embodiments, a wheel link floating pivot of a suspension system of the invention is located below a wheel link, a brake link, a wheel link fixed pivot, a control link floating pivot, a control link, a control link fixed pivot, a first shock pivot, a shock absorber, a second shock pivot, and/or an instant force center, or any one or more of these components, of a suspension system according to the invention when the suspension is uncompressed and the vehicle is on even ground when even ground is perpendicular to gravity. In certain embodiments, a wheel link floating pivot of a suspension system of the invention is located above a wheel link, a wheel link fixed pivot, a second shock pivot, and/or an instant force center, or any one or more of these components, of a suspension system according to the invention when the suspension is uncompressed and the vehicle is on even ground when even ground is perpendicular to gravity.

5.8 Control Link Floating Pivots of Suspension Systems of the Invention

A suspension system of the current invention, in certain embodiments, comprises a control link floating pivot, or two, three, four, five or more control link floating pivots. In certain embodiments, a control link floating pivot of a suspension system of the invention is located below a control link fixed pivot, a first shock pivot, a shock absorber, a second shock pivot, a control link, a wheel link floating pivot, and/or an instant force center, or any one or more of these components, of a suspension system according to the invention when the suspension is uncompressed and the vehicle is on even ground when even ground is perpendicular to gravity. In certain embodiments, a control link floating pivot of a suspension system of the invention is located above a wheel link floating pivot, a wheel link, a brake link, a wheel link fixed pivot, a control link fixed pivot, a control link, a first shock pivot, a shock absorber, a second shock pivot, and/or an instant force center, or any one or more of these components, of a suspension system according to the invention when the suspension is uncompressed and the vehicle is on even ground when even ground is perpendicular to gravity.

5.9 First Shock Pivots of Suspension Systems of the Invention

A suspension system of the current invention, in certain embodiments, comprises a first shock pivot, or two, three, four, five or more first shock pivots. In certain embodiments, a first shock pivot of the invention can be connected to a brake link, a control link, a wheel link, a frame, a control link floating pivot, a control ink fixed pivot, a wheel link floating pivot, a wheel link fixed pivot, and/or share mounting with an other pivot. In certain embodiments, a first shock pivot of a suspension system of the invention is located below a control link floating pivot, a control link fixed pivot, a shock absorber, and/or a second shock pivot, or any one or more of these components, of a suspension system according to the invention when the suspension is uncompressed and the vehicle is on even ground when even ground is perpendicular to gravity. In certain embodiments, a first shock pivot of a suspension system of the invention is located above a wheel link floating pivot, a wheel link, a brake link, a wheel link fixed pivot, a control link fixed pivot, a control link floating pivot, a control link, a shock absorber, a second shock pivot, and/or an instant force center, or any one or more of these components, of a suspension system according to the invention when the suspension is uncompressed and the vehicle is on even ground when even ground is perpendicular to gravity.

5.10 Second Shock Pivots of Suspension Systems of the Invention

A suspension system of the current invention, in certain embodiments, comprises a second shock pivot, or two, three, four, five or more second shock pivots. In certain embodiments, a second shock pivot of the invention can be connected to a brake link, a control link, a wheel link, a frame, a control link floating pivot, a control ink fixed pivot, a wheel link floating pivot, a wheel link fixed pivot, and/or share mounting with an other pivot. In certain embodiments, a second shock pivot of a suspension system of the invention is located below a wheel link floating pivot, a wheel link, a brake link, a wheel link fixed pivot, a control link fixed pivot, a control link floating pivot, a control link, a shock absorber, and/or an instant force center, or any one or more of these components, of a suspension system according to the invention when the suspension is uncompressed and the vehicle is on even ground when even ground is perpendicular to gravity. In certain embodiments, a second shock pivot of a suspension system of the invention is located above a wheel link floating pivot, a wheel link, a brake link, a wheel link fixed pivot, a control link fixed pivot, a control link floating pivot, a control link, a shock absorber, and/or an instant force center, or any one or more of these components, of a suspension system according to the invention when the suspension is uncompressed and the vehicle is on even ground when even ground is perpendicular to gravity.

5.11 Wheel Rotation Axis of Suspension Systems of the Invention

A suspension system of the current invention, in certain embodiments, comprises a wheel rotation axis, or two or more wheel rotation axes. In certain embodiments, a wheel rotation axis of a suspension system of the invention is concentric with a wheel link floating pivot of the vehicle, preferably the wheel rotation axis of a rear wheel of the vehicle. In certain other embodiments, a wheel rotation axis is nearly concentric with a wheel link floating pivot of the vehicle. A wheel rotation axis is nearly concentric with a wheel link floating pivot if the axis the pivot turns around is within 2 cm of the wheel rotation axis, or within 5 cm, or within 10 cm, or within 15 cm, or when the wheel axis and pivot axis are from 2 to 20 cm away from each other, or from 5 to 15 cm, or from 5 to 10 cm.

In certain embodiments, a wheel rotation axis of a suspension system of the invention is located below a wheel link, a brake link, a wheel link fixed pivot, a control link floating pivot, a control link, a control link fixed pivot, a first shock pivot, a shock absorber, a second shock pivot, and/or an instant force center, or any one or more of these components, of a suspension system according to the invention when the suspension is uncompressed and the vehicle is on even ground when even ground is perpendicular to gravity. In certain embodiments, a wheel rotation axis of a suspension system of the invention is located above a wheel link, a wheel link fixed pivot, a second shock pivot, and/or an instant force center, or any one or more of these components, of a suspension system according to the invention when the suspension is uncompressed and the vehicle is on even ground when even ground is perpendicular to gravity.

5.12 Shock Absorbers of Suspension Systems of the Invention

A suspension system of the current invention, in certain embodiments, comprises a shock absorber, or two, three, four, five or more shock absorbers. A shock absorber, in certain embodiments, may be a damper, a spring, a compression gas spring, a leaf spring, a coil spring, or a fluid. A shock absorber, in certain embodiments may comprise a fist shock pivot, a second shock pivot, a body, a shaft, a spring, an air spring, a gas spring, a bushing, a shaft axial movement, a shock length, a strut, and/or a piston. A shock absorber can be called a shock absorber, a shock, a spring damper unit, a spring, a damper, an energy converter, and/or a heat converter. In certain embodiments of the invention a shock absorber can be compressed or extended as the suspension moves towards a state of full compression. In certain embodiments, a shock absorber can be compressed at a constant or variable rate as the suspension moves towards a state of full compression. As a wheel is compressed, incremental vertical compression distance measurements are taken. Incremental vertical compression distance is measured perpendicular to gravity and a ground plane. These incremental vertical measurements are called the incremental vertical compression distance. A shock absorber length can be changed by a wheel link, and/or brake link, and/or control link movements as the suspension compresses. At each incremental vertical compression distance measurement, a shock absorber length measurement is taken. The relationship between incremental vertical compression distance change and shock absorber length change for correlating points in the suspension's compression is called leverage ratio, leverage rate, motion ratio or motion rate. A leverage rate curve is a graphed quantifiable representation of leverage rate versus wheel compression distance or percentage of full compression. Leverage rates and creation of leverage rate curves are discussed and shown in Section 5.18 and FIG. 18. A shock absorber has a measured shock length. A shock length can also be called length and is measured as the shortest straight line distance between a first shock pivot and second shock pivot. A spring in a shock absorber can have a spring rate defined as the amount of force output at a given shock length. As a shock length is changed, spring force changes. This change can be graphed as spring rate. A spring found in a shock absorber can have a spring rate that varies or is constant as the shock absorber is compressed at a constant rate. In certain embodiments, a shock absorber of a suspension system of the invention is located below a control link floating pivot, a control link fixed pivot, a first shock pivot, and/or a second shock pivot, or any one or more of these components, of a suspension system according to the invention when the suspension is uncompressed and the vehicle is on even ground when even ground is perpendicular to gravity. In certain embodiments, a shock absorber of a suspension system of the invention is located above a wheel link floating pivot, a wheel link, a brake link, a wheel link fixed pivot, a control link fixed pivot, a control link floating pivot, a control link, a first shock pivot, a second shock pivot, and/or an instant force center, or any one or more of these components, of a suspension system according to the invention when the suspension is uncompressed and the vehicle is on even ground when even ground is perpendicular to gravity. In certain embodiments, a shock absorber of a suspension system of the invention is located in front of a control link floating pivot, a control link fixed pivot, a first shock pivot, and/or a second shock pivot, or any one or more of these components, of a suspension system according to the invention when the suspension is uncompressed and the vehicle is on even ground when even ground is perpendicular to gravity. In certain embodiments, a shock absorber of a suspension system of the invention is located behind a wheel link floating pivot, a wheel link, a brake link, a wheel link fixed pivot, a control link fixed pivot, a control link floating pivot, a control link, a first shock pivot, a second shock pivot, and/or an instant force center, or any one or more of these components, of a suspension system according to the invention when the suspension is uncompressed and the vehicle is on even ground when even ground is perpendicular to gravity.

5.13 Control Link Force Lines of Suspension Systems of the Invention

A suspension system of the current invention, in certain embodiments, comprises a control link force line, or two, three, four, five or more control link force lines. In certain embodiments, a control link force line projects through a control link fixed pivot and a control link floating pivot of a suspension system of the invention. A control link force line, in certain embodiments, is parallel or substantially parallel to the ground, or at an angle of minus 60 to plus 60 degrees, or minus 45 to plus 45 degrees, or minus 30 to plus 30 degrees, or minus 15 to plus 15 degrees, or minus 10 to plus 10 degrees, or minus 5 to plus 5 degrees relative to the ground, when the suspension is uncompressed and the vehicle is on even ground when even ground is perpendicular to gravity. In certain other embodiments, a control link force line descends from the rear to the front of the vehicle at an angle of 0 to 90 degrees, or 0 to 50 degrees, or 0 to 20 degrees, or 0 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a control link force line ascends from the rear to the front of the vehicle at an angle of 0 to 90 degrees, or 0 to 50 degrees, or 0 to 20 degrees, or 0 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a control link force line descends from the rear to the front of the vehicle at an angle of 0 to 90 degrees, or 0 to 60 degrees, or 10 to 90 degrees, or 30 to 80 degrees, or 50 to 80 degrees, or 60 to 80 degrees, when the vehicle is on even ground when even ground is perpendicular to gravity and the suspension is fully compressed. In certain other embodiments, a control link force line projects from the rear to the front of the vehicle at an angle of −90 to 90 degrees, −50 to 50 degrees, 0 to 90 degrees, or 0 to 60 degrees, or 1 to 50 degrees, or 2 to 20 degrees, or 2 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a control link force line projects from the rearward in relation to the driven wheel at an angle of −90 to 90 degrees, −50 to 50 degrees, 0 to 90 degrees, or 0 to 60 degrees, or 1 to 50 degrees, or 2 to 20 degrees, or 2 to 10 degrees, or 5 to 15 degrees, or 10 to 20 degrees, or 20 to 30 degrees, when the suspension is uncompressed and the vehicle is on even ground when even ground is perpendicular to gravity.

5.14 Wheel Link Force Lines of Suspension Systems of the Invention

A suspension system of the current invention, in certain embodiments, comprises a wheel link force line, or two, three, four, five or more wheel link force lines. In certain embodiments, a wheel link force line projects through a wheel link fixed pivot and a wheel link floating pivot of a suspension system of the invention. A wheel link force line, in certain embodiments, is parallel or substantially parallel to the ground, or at an angle of minus 60 to plus 60 degrees, or minus 45 to plus 45 degrees, or minus 30 to plus 30 degrees, or minus 15 to plus 15 degrees, or minus 10 to plus 10 degrees, or minus 5 to plus 5 degrees relative to the ground, when the suspension is uncompressed and the vehicle is on even ground when even ground is perpendicular to gravity. In certain other embodiments, a wheel link force line descends from the rear to the front of the vehicle at an angle of 0 to 90 degrees, or 0 to 50 degrees, or 0 to 30 degrees, or 0 to 20 degrees, or 0 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a wheel link force line ascends from the rear to the front of the vehicle at an angle of 0 to 90 degrees, or 0 to 50 degrees, or 0 to 30 degrees, or 0 to 20 degrees, or 0 to 10 degrees, or 5 to 15 degrees, or 10 to 20 degrees, or 20 to 30 degrees, when the suspension is uncompressed and the vehicle is on even ground when even ground is perpendicular to gravity. In certain other embodiments, a wheel link force line descends from the rear to the front of the vehicle at an angle of 10 to 90 degrees, or 30 to 80 degrees, or 50 to 80 degrees, or 60 to 80 degrees, when the vehicle is on even ground when even ground is perpendicular to gravity and the suspension is fully compressed. In certain other embodiments, a wheel link force line projects from the rear to the front of the vehicle at an angle of −90 to 90 degrees, −50 to 50 degrees, −30 to 30 degrees, −15 to 45 degrees, −20 to 20 degrees, −10 to 10 degrees when the suspension is uncompressed and the vehicle is on even ground when even ground is perpendicular to gravity.

5.15 Instant Force Centers of Suspension Systems of the Invention

A suspension system of the current invention, in certain embodiments, comprises an instant force center, or two, three, four, five or more instant force centers. An instant force is a point where a control link force line of a suspension system of the invention intersects with a wheel link force line of that suspension system. In certain other embodiments, a control link force line and a wheel link force line of a suspension system of the invention intersect when the suspension is uncompressed, when the suspension is fully compressed, and/or at any point of partial compression of the suspension system. In certain other embodiments, an instant force center of a suspension system of the invention is in different locations when the suspension is uncompressed and when the suspension is fully compressed. In certain embodiments, an instant force center of a suspension system of the invention is located above a wheel link floating pivot, a wheel link, a brake link, a wheel link fixed pivot, a control link floating pivot, a control link, a control link fixed pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain embodiments, an instant force center of a suspension system of the invention is located below a wheel link floating pivot, a wheel link, a brake link, a wheel link fixed pivot, a control link floating pivot, a control link, a control link fixed pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain embodiments, an instant force center of a suspension system of the invention is located behind a wheel link floating pivot, a wheel link, a brake link, a wheel link fixed pivot, a control link floating pivot, a control link, a control link fixed pivot, a first shock pivot, a shock absorber, and/or a second shock pivot, or any one or more of these components, of a suspension system according to the invention when the suspension is uncompressed and the vehicle is on even ground when even ground is perpendicular to gravity. In certain embodiments, an instant force center of a suspension system of the invention is located further to the front of the vehicle than a wheel link floating pivot, a wheel link, a brake link, a wheel link fixed pivot, a control link floating pivot, a control link, a control link fixed pivot, a first shock pivot, a shock absorber, and/or a second shock pivot, or any one or more of these components, of a suspension system according to the invention when the suspension is uncompressed and the vehicle is on even ground when even ground is perpendicular to gravity.

In certain embodiments of a suspension of the invention, an instant force center location is governed by the angle between and location of a wheel link and control link, and the closer to parallel a wheel link and control link are, the nearer to infinity is the instant force center perpendicular distance to the ground. In certain other embodiments, an instant force center of a suspension system of the invention has a first perpendicular distance from the ground, when the ground is level and perpendicular to gravity and when the suspension is uncompressed. In certain embodiments, an instant force center of a suspension system of the invention has a second perpendicular distance from the ground when the ground is level and perpendicular to gravity, when the suspension is compressed to a point further in the travel (in other words, partially to fully compressed), for example, when the suspension is 40 percent compressed, or 50 percent, or 60 percent, or fully compressed (in other words, 100 percent compressed). In certain other embodiments, the difference between the first perpendicular distance and second perpendicular distance can vary, for example, the difference may be from 0 to infinity, or to 10,000 meters (m), or 0 to 5000 m, or 0 to 2500 m, or 0 to 1000 m, or 0 to 100 m, or 0 to 10 m, or 0 to 0.5 m, or 0 to 0.2 m, 0 to 0.1 m.

5.16 Further Embodiments of the Invention

A vehicle using a suspension of the invention may, in certain embodiments, comprise a measurable suspension parameter, a link length or link lengths measured from the center of one link pivot to another, vehicle metrics, a frame, a moving suspension component, a pivot, a rotary motion device, a motion control device, and/or a power-train component.

A measurable suspension parameter and vehicle metrics, in certain embodiments, may comprise a wheelbase, track width, camber, caster, anti squat, pro squat, zero squat, squat, rake, trail, offset, fork offset, spindle offset, chainstay length, swingarm length, distance between driven wheel rotation axis and power unit output spindle axis, chain length, belt length, bottom bracket, bottom bracket offset, drive spindle, drive spindle offset, drive spindle height, wheel diameter, driven wheel diameter, driven wheel spindle height, chainstay slope, chainstay rise, center of mass, center of mass height, center of mass offset, center of mass offset from drive spindle, length, magnitude, top tube length, downtube length, front center distance, seat tube length, seatstay length, headset stack height, head tube angle, fork angle, impact angle, fork rake, crown rake, handlebar height, bar height, bar sweep, handlebar sweep, handlebar rise, bar rise, crank length, crank arm length, pitch diameter, gear pitch diameter, sprocket pitch diameter, cog pitch diameter, front gear pitch diameter, front sprocket pitch diameter, front cog pitch diameter, rear gear pitch diameter, rear sprocket pitch diameter, rear cog pitch diameter, first intermediate gear pitch diameter, second intermediate gear pitch diameter, first intermediate sprocket pitch diameter, second intermediate sprocket pitch diameter, first intermediate cog pitch diameter, second intermediate cog pitch diameter, instant center, instant force center, center of curvature, axle path, axle path center of curvature, moving center of curvature, forward moving center of curvature, forward moving instant center, rearward moving instant center, instant center movement direction change, center of curvature path, instant center path, instant center path focus, moving instant center path focus, virtual force center, virtual instant force center, virtual force center path, driving force, chain force, anti rotation force, sprocket force, bevel gear force, rotational force, driving force vector, chain pull, chain pull force, chain pull force vector, idler gear height, idler gear pitch diameter, idler cog pitch diameter, idler sprocket pitch diameter, jackshaft gear pitch diameter, jackshaft cog pitch diameter, jackshaft sprocket pitch diameter, leverage rate, leverage ratio, damper leverage rate, damper leverage ratio, spring leverage rate, spring leverage ratio, wheel motion ratio, wheel rate, spring rate, damping rate, leverage rate progression curve, leverage rate progression, progressive rate, regressive rate, straight rate, varying rate, suspension compression, full suspension compression, suspension extension, full suspension extension, droop travel, full droop travel, suspension ride height, static ride height, neighed ride height, laden ride height, weighted ride height, beginning of travel, middle of travel, end of travel, 0 percent travel to 20 percent travel, 20 percent travel to 80 percent travel, 80 percent travel to 100 percent travel, 0 percent travel to 25 percent travel, 25 percent travel to 75 percent travel, 75 percent travel to 100 percent travel, 0 percent travel to 30 percent travel, 30 percent travel to 65 percent travel, 65 percent travel to 100 percent travel, 0 percent travel to 35 percent travel, 35 percent travel to 60 percent travel, 60 percent travel to 100 percent travel, powertrain component rotation axis, driven wheel rotation axis, non driven wheel rotation axis, sprocket rotation axis, axis, axis location, rear wheel rotation axis, front wheel rotation axis, contact patch, tire contact patch, tire to ground contact patch, driven wheel tire to ground contact patch, non driven wheel tire to ground contact patch, front wheel tire to ground contact patch, rear wheel tire to ground contact patch, chain force vector, driving force vector, squat force vector, first carrier manipulation link force vector, second carrier manipulation link force vector, squat definition point, squat layout line, lower squat measurement definition line, measured squat distance, driven wheel axle path, driven wheel suspension travel distance, stable squat magnitude curve, defines a squat magnitude curve upper bound, a squat magnitude curve lower bound, instant force center, driven wheel rotation axis, chain force vector and driving force vector intersection point, driving cog rotation axis, center of the forward wheel tire to ground contact patch, center of the driven wheel tire to ground contact patch, vehicle center of sprung mass, 200 percent squat point, 200 percent measurement value, direction of gravity, squat magnitude definition point, squat magnitude, center of mass intersection vector, squat magnitude definition vector, percent squat magnitude variation, first squat magnitude curve slope, first squat magnitude curve slope, second squat magnitude curve slope, third squat magnitude curve slope, instant force center path, instant force center path focus, pitch diameter, driven idler cog rotation axis, instant force center position uncompressed, instant force center position compressed, instant force center movement, and/or an instant force center movement.

A frame, in certain embodiments, may be comprised of a solid beam, a solid bar, a metal bar, a plastic bar, a composite bar, a tube, a metal tube, an aluminum tube, a titanium tube, a steel tube, a composite tube, a carbon tube, a boron tube, an alloy tube, a magnesium tube, a stiff tube, a flexible tube, a thin walled tube, a thick walled tube, a butted tube, a single butted tube, a double butted tube, a triple butted tube, a quadruple butted tube, a straight gage tube, a round tube, a square tube, a rectangular tube, a rounded corner tube, a shaped tube, an aero tube, a streamline tube, a plus shaped tube, a bat shaped tube, a tube that transitions from a round tube to a rectangular tube, a tube that transitions from a round tube to a square tube, a tube that transitions from a round tube to a rounded corner tube, a tube that transitions from a round tube to a shaped tube, welding, MIG welding, TIG welding, laser welding, friction welding, a welded tube, a TIG welded tube, a MIG welded tube, a laser welded tube, a friction welded tube, a monocoque section, a monocoque frame, metal monocoque, TIG welded monocoque, MIG welded monocoque, laser welded monocoque, friction welded monocoque, carbon monocoque, Kevlar monocoque, fiberglass monocoque, composite monocoque, fiberglass, carbon fiber, foam, honeycomb, stress skin, braces, extrusion, extrusions, metal inserts, rivets, screws, castings, forgings, CNC machined parts, machined parts, stamped metal parts, progressive stamped metal parts, tubes or monocoque parts welded to cast parts, tubes or monocoque parts welded to forged parts, tubes or monocoque parts welded to machined parts, tubes or monocoque parts welded to CNC machined parts, glue, adhesive, acrylic adhesive, methacrylate adhesive, bonded panels, bonded tubes, bonded monocoque, bonded forgings, bonded castings, tubes bonded to CNC machined parts, tubes bonded to machined parts, tubes bonded to castings, tubes bonded to forgings, gussets, supports, support tubes, tabs, bolts, tubes welded to tabs, monocoque welded to tabs, tubes bolted to tabs, injection molded parts, seatstays, chainstays, a seatstay, a chainstay, a seat tube, seat tower, seatpost, seat, top tube, upper tube, downtube, lower tube, top tubes, down tubes, seat tube brace, and/or a seat tube support.

A moving suspension component of a suspension system of the invention, according to certain embodiments, may be comprised of a link, a wheel carrier link, a wheel carrier, a carrier manipulation link, an upper carrier manipulation link, lower carrier manipulation link, first carrier manipulation link, second carrier manipulation link, swingarm, swingarms, swinging arm, swinging arms, swing link, swing links, first link, second link, upper link, lower link, top link, bottom link, forward link, rearward link, front link, back link, primary link, secondary link, flexure, flexures, first flexure, second flexure, upper flexure, lower flexure, top flexure, bottom flexure, forward flexure, rearward flexure, front flexure, back flexure, primary flexure, secondary flexure, carrier manipulation flexures, sliders, curved sliders, straight sliders, complex curved sliders, carriers, tracks, curved tracks, straight tracks, complex curved tracks, bearings, cams, gears, seals, pivots, shock link, linkages, shock driving links, A-Arms, H-Arms, support arms, upper support, lower support, double arms, single arms, single pivot, multi pivot, SLA, Short Long Arm, hub carrier, wheel carrier, spindle, spindle carrier, wheel support, spindle support, trailing arm, semi-trailing arm, swingarm, double swingarm, parallel links, semi-parallel links, perpendicular links, strut, MacPherson strut, suspension strut, linear bearing, linear bushing, stanchion, fork, fork lower, 4-bar linkage, 5-bar linkage, 6-bar linkage, 7 bar linkage, 8 bar linkage, linkage, multi link, trackbar, panhard bar, watts link, watt link, ball joints, heim joint, radial joint, rotary joint, internal damper, external damper, enclosed damper, enclosed spring, caster block, camber block, caster wedge, driven wheel, vehicle chassis, first link fixed pivot, second link fixed pivot, first link floating pivot, second link floating pivot, driving cog, driven cog, forward wheel, driven idler cog, spring damper unit, first carrier manipulation track, second carrier manipulation track, first carrier manipulation slider, second carrier manipulation slider, first carrier manipulation slider pivot, second carrier manipulation slider pivot, stiffening link, and/or a stiffening linkage.

A pivot and a rotary motion devices of a suspension of the invention, according to certain embodiments, may be comprised of a pivot, a main pivot, a chainstay pivot, a seatstay pivot, an upper main pivot, a lower frame pivot, an upper frame pivot, a bottom frame pivot, a top frame pivot, a forward frame pivot, a rearward frame pivot, a front frame pivot, a rear frame pivot, a primary frame pivot, a secondary frame pivot, a tertiary frame pivot, a first frame pivot, a second frame pivot, a third frame pivot, a fourth frame pivot, combinations of pivots, bearing pivots, bushing pivots, bearings, bushings, seals, grease ports, greased pivots, oiled pivots, needle bearing pivots, journal bearing pivots, DU bearing pivots, plastic bushing pivots, plastic bearing pivots, a flexure, flexures, composite flexures, titanium flexures, aluminum flexures, steel flexures, aluminum pivot shafts, stainless steel pivot shafts, steel pivot shafts, titanium pivot shafts, plastic pivot shafts, composite pivot shafts, hardened bearing races, hardened pivot shafts, anodized pivot shafts, plated pivot shafts, coated pivot shafts, bearing caps, bearings seals, o-rings, o-ring seals, x-rings, and/or a x-ring seal.

A motion control device of a suspension of the invention, according to certain embodiments, may be comprised of a shock, a shock absorber, a spring damper unit, a damper, a spring, a coil spring, a leaf spring, a compression spring, an extension spring, an air spring, a nitrogen spring, a gas spring, a torsion spring, a constant force spring, a flat spring, a wire spring, a carbon spring, a negative spring, a positive spring, a progressive spring, multiple springs, stacked springs, springs in series, springs in parallel, springs separate from a damper unit, a damper unit, hydraulics, hydraulic pistons, hydraulic valves, air valves, air cans, gears, cams, a cam, a gear, non-circular gears, linear damper, rotary damper, vane damper, friction damper, poppet valve, compensation spring, negative spring, elastomer, rubber bumper, bumper, progressive bumper, hydraulic bottoming bumper, pressure compensation, heat compensation, oil, water, damping fluid, cooling fluid, shims, pressure, shaft, through shaft, eyelet, adjusters, compensator, hose, reservoir, remote reservoir, low speed adjuster, high speed adjuster, mid range adjuster, bypass circuit, foot valve, large bump adjuster, small bump adjuster, high velocity adjuster, low velocity adjuster, hydraulic ram, hydraulic piston, active suspension, and/or a microprocessor.

A powertrain component of a suspension of the invention, according to certain embodiments, may be comprised of an energy storage device, a battery, fuel, a fuel tank, a flywheel, a liquid fuel, solid fuel, rocket fuel, a reactor, steam, a nuclear reactor, a fusion reactor, pressure, air pressure, hydraulic pressure, gas pressure, expanding gas, a motor, an electric motor, a hydraulic motor, a turbine motor, a steam turbine, a gas turbine motor, an engine, a gasoline engine, a diesel engine, diesel, gasoline, alcohol, sterling engine, a two stroke engine, a four stroke engine, miller cycle engine, ramjet engine, turbine engine, rocket engine, human power, horse power, animal power, potential energy, spring, compression spring, extension spring, constant force spring, progressive spring, power transfer components, wire, rope, string, chain, belt, shaft, gear, cog, cam, sprocket, pulley, lever, clutch, one way clutch, one way bearing, bearing, ball bearing, journal bearing, bushing, drive sprocket, driven sprocket, drive cog, driven cog, drive gear, driven gear, intermediate cog, intermediate sprocket, intermediate gear, idler cog, idler sprocket, idler gear, bottom bracket, bottom bracket spindle, crank arm, foot pedal, pedal, hand crank, cassette, sprocket cluster, derailleur, front derailleur, rear derailleur, chainguide, single ring chainguide, dual ring chainguide, multi ring chainguide, shifter, shift lever, shifter cable, shifter hose, hydraulic shifting, air shifting, pneumatic shifting, gearbox, transmission, continuously variable transmission, infinitely variable transmission, direct drive, tire, wheel, track, track segment, idler wheel, jet, driving cog, driven cog, forward wheel, driven idler cog.

Certain embodiments of the current invention may comprise a braking system which could further comprise disc brakes, calipers, disc caliper, hydraulic brakes, mechanical brakes, brake levers, brake hose, brake cable, brake pads, caliper brakes, rim brakes, V-brakes, cantilever brakes, friction brakes, wheel brake, mounting bolts, international brake standard mounting.

A suspension of the invention will comprise a linkage system which further comprise pivoting means concentric to a wheel rotation axis so that braking forces can be controlled by tactical placement of an instant force center, and so that acceleration forces can be controlled by the placement of a fixed pivot or pivots of a swinging wheel link.

5.17 Axles of Suspension Systems of the Invention

A suspension system of the current invention, in certain embodiments, comprises an axle. An axle can pass through a hub or fix a hub to a wheel link, brake link, dropout, vertical dropout, horizontal dropout, slot, hole, threaded hole or other axle attachment means. An axle can be a thru axle that passes through a hub, a quick release, QR, or other type of axle. An axle can be used to mount hub concentric to a wheel link floating pivot, yet still allow removal of the hub for convenience. A thru axle can comprise a solid axle, a thru axle, a hollow axle, a QR, a quick release, a skewer, a quick release skewer, a through bolt, or other components intended to allow hub rotation around a wheel rotation axis. A quick release in certain embodiments can comprise a thru axle, a skewer, a axle axial stop, a quick release lever, and or a quick release mechanism. The quick release lever is a mechanical lever or other means that can be used to provide clamping force through a quick release mechanism to clamp the rear hub between the floating pivots and or between a wheel link, brake link, pivot axle or combination of wheel link and brake link and pivot axle. A quick release mechanism can comprise a cam, a pivot, a taper, a thread, a bearing, a bushing, or other mechanical devices intended to develop a clamping force axial with the wheel rotation axis. The thru axle can be connected to the wheel link, for example, via a threaded connection on the drive (right) side or brake (left) side. The thru axle can be screwed into the wheel link or brake link and a quick release mechanism is used to axially clamp a hub.

5.18 Leverage Rate Curves of Suspension Systems of the Invention

A suspended wheel has a compressible wheel suspension travel distance that features a beginning travel point where the suspension is completely uncompressed to a point where no further suspension extension can take place, and an end travel point where a suspension is completely compressed to a point where no further suspension compression can take place. At the beginning of the wheel suspension travel distance, when the suspension is in a completely uncompressed state, the shock absorber is in a state of least compression, and the suspension is easily compressed. As the suspended wheel moves compressively, shock absorber force at the wheel changes in relation to shock absorber force multiplied by a leverage ratio, where a leverage ratio is the ratio of compressive wheel travel change divided by shock absorber measured length change over an identical and correlating given wheel travel distance. Shock absorbers can output an increase in force for a compression or extension movement depending on the design of the shock absorber. In certain embodiments of the invention a shock absorber is compressed or extended as the suspension moves towards a state of full compression. A leverage rate curve is a graphed quantifiable representation of leverage rate versus wheel compression distance or percentage of full compression. Wheel compression distance or vertical wheel travel is measured perpendicular to gravity with the initial 0 percent measurement taken at full suspension extension with the vehicle unladen and on even ground. As a suspension of the invention is compressed from a point of full extension to a point of full compression at a constant rate, measurements of shock absorber length are taken as the shortest distance between a first shock pivot and a second shock pivot at equal increments of shock absorber compression. When graphed as a curve on a Cartesian graph, leverage rate is shown on the Y axis escalating from the x axis in a positive direction, and vertical wheel travel is shown on the X axis escalating from the Y axis in a positive direction. In certain embodiments, a shock absorber can be compressed at a constant or variable rate as the suspension moves towards a state of full compression. As a wheel is compressed, incremental vertical compression distance measurements are taken. Incremental vertical compression distance is measured perpendicular to gravity and a ground plane. These incremental vertical measurements are called the incremental vertical compression distance. A shock absorber length can be changed by a wheel link, and/or brake link, and/or control link movements as the suspension compresses. At each incremental vertical compression distance measurement, a shock absorber length measurement is taken. The relationship between incremental vertical compression distance change and shock absorber length change for correlating points in the suspension's compression is called leverage ratio, leverage rate, motion ratio or motion rate. The measurement of force output at the wheel over travel is called wheel rate and is found by multiplying spring force times leverage rate at each increment of shock compression. Multiplying spring force times leverage rate at each increment of shock compression and graphing the values will output a quantifiable representation of spring force output at the rear wheel as the suspension is compressed, and this representation is useful for a designer or engineer to tactically plan a desired wheel rate. A spring in a shock absorber can have a spring rate defined as the amount of force output at a given shock length. As a shock length is changed, spring force changes. This change can be graphed as spring rate. A spring found in a shock absorber can have a spring rate that varies or is constant as the shock absorber is compressed at a constant rate. This constant or variable spring rate can be manipulated into a desired wheel rate by a tactically planned leverage rate. Leverage ratios of the current invention are designed to achieve a desired force output at a wheel. In certain embodiments a leverage rate curve can be broken down into three equal parts in relation to wheel compression distance or vertical wheel travel, a beginning ⅓ (third), a middle ⅓, and an end ⅓. In certain embodiments, a beginning ⅓ can comprise a positive slope, zero slope, and or a negative slope. In certain embodiments, a middle ⅓ can comprise a positive slope, zero slope, and or a negative slope. In certain embodiments, an end ⅓ can comprise a positive slope, zero slope, and or a negative slope. Certain preferred embodiments can comprise a beginning ⅓ with a positive slope, a middle ⅓ with a less positive slope, and an end ⅓ with a more positive slope. Certain preferred embodiments can comprise a beginning ⅓ with a negative slope, a middle ⅓ with negative and zero slope, and an end ⅓ with a positive slope. Certain preferred embodiments can comprise a beginning ⅓ with a positive and negative slope, a middle ⅓ with negative and zero slope, and an end ⅓ with a positive slope. Certain preferred embodiments can comprise a beginning ⅓ with a positive and negative slope, a middle ⅓ with negative and zero slope, and an end ⅓ with a more negative slope.

The present invention is not to be limited in scope by the specific embodiments described herein, which are intended as single illustrations of individual aspects of the invention, and functionally equivalent methods and components are within the scope of the invention. Indeed, various modifications of the invention, in addition to those shown and described herein, will become apparent to those skilled in the art from the foregoing description. Such modifications are intended to fall within the scope of the appended claims. Throughout this application the singular includes the plural and the plural includes the singular, unless indicated otherwise. All cited publications, patents, and patent applications are herein incorporated by reference in their entirety.

What is claimed is:

1. A suspension system for a vehicle comprising a wheel link floating pivot, a wheel rotation axis, a wheel link, a control link, a control link fixed pivot, a brake link, a shock absorber, and a thru axle; wherein said thru axle is selected from the group consisting of a solid axle, a thru axle, a hollow axle, a quick release, a skewer, a quick release skewer, and a through bolt, such that a rear hub is mounted concentric to the wheel link floating pivot; wherein said rear hub is positioned between components selected from the group consisting of the wheel link, the brake link and a pivot axle, such that said rear hub is removable; wherein said wheel link floating pivot is concentric with said wheel rotation axis; wherein said shock absorber is selected from the group consisting of a damper, a compression gas spring, a leaf spring, a coil spring, and a fluid; wherein said shock absorber is mounted to a link selected from the group consisting of the brake link and the control link, such that said shock absorber is able to respond to movement of a rear wheel; wherein said brake link is pivotally connected to a control link; and wherein as the suspension is compressed or extended, said shock absorber is compressed or extended, so that force that compresses or extends said shock absorber is transmitted through said brake link and said wheel link floating pivot; and wherein a leverage ratio curve of said suspension system has a negative or a positive slope in the beginning ⅓ (third) and in the end ⅓ (third), and a change in slope value in the middle ⅓ (third).

2. The suspension system of claim 1, wherein force is transmitted to said shock absorber through said control link and a control link floating pivot.

3. The suspension system of claim 1, said suspension system further comprising an instant force center that is in different locations when the suspension is fully compressed compared to the when the suspension is uncompressed.

4. The suspension system of claim 3, said suspension system further comprising a forward moving instant force center that is located further to the front of the vehicle than the wheel link fixed pivot when the suspension is uncompressed.

5. The suspension system of claim 3, said suspension system further comprising a forward moving instant force center that is located behind the wheel link fixed pivot when the suspension is uncompressed.

6. The suspension system of claim 3, said suspension system further comprising a rearward moving instant force center that is located further to the front of the vehicle than the wheel link fixed pivot when the suspension is uncompressed.

7. The suspension system of claim 1, said suspension system further comprising a removable pivot axle; wherein said removable pivot axle has a feature for positioning a rear hub in relation to said wheel rotation axis, wherein said removable pivot axle can receive a thru axle selected from the group consisting of a solid axle, a thru axle, a hollow axle, a quick release, a skewer, a quick release skewer, and a through bolt.

8. The suspension system of claim 1, said suspension system further comprising a rear hub, a derailleur hanger, and a brake mount, said derailleur hanger being adjacent to one side of said rear hub, and said brake mount and brake link being positioned adjacent to the opposite side of said rear hub, wherein said wheel link is mounted outboard of and adjacent to said brake mount and said brake link.

9. The suspension system of claim 1, wherein a said leverage ratio curve of said suspension system has a negative slope in the beginning ⅓ (third) and a positive slope in the end ⅓ (third), and a change in slope value in the middle ⅓ (third).

10. The suspension system of claim 1, wherein a said leverage ratio curve of said suspension system has a positive slope in the beginning ⅓ (third) and a negative slope in the end ⅓ (third), and a change in slope value in the middle ⅓ (third).

11. A suspension system for a vehicle comprising a wheel link floating pivot, a wheel rotation axis, a wheel link, a control link, a control link fixed pivot, a brake link, and a shock absorber; wherein said wheel link floating pivot is concentric with said wheel rotation axis; wherein said shock absorber is selected from the group consisting of a damper, a compression gas spring, a leaf spring, a coil spring, and a fluid; and wherein said shock absorber is mounted to a link selected from the group consisting of the brake link and the control link, such that said shock absorber is able to respond to movement of a rear wheel; wherein said brake link is pivotally connected to said control link; wherein as the suspension is compressed or extended, said shock absorber is compressed or extended, so that force that compresses or extends said shock absorber is transmitted through said brake link and said wheel link floating pivot; wherein said suspension system comprises a compressible wheel suspension travel distance that features a beginning travel point where the suspension is completely uncompressed to a point where no further suspension extension can take place, and an end travel point where a suspension is completely compressed to a point where no further suspension compression can take place; and wherein a leverage ratio curve of said suspension system has a negative or a positive slope in the beginning ⅓ (third) and in the end ⅓ (third), and a change in slope value in the middle ⅓ (third).

12. The suspension system of claim 11, wherein force is transmitted to said shock absorber through said control link and a control link floating pivot.

13. The suspension system of claim 11, said suspension system further comprising an instant force center that is in different locations when the suspension is fully compressed compared to the when the suspension is uncompressed.

14. The suspension system of claim 13, said suspension system further comprising a forward moving instant force center that is located further to the front of the vehicle than the wheel link fixed pivot when the suspension is uncompressed.

15. The suspension system of claim 13, said suspension system further comprising a forward moving instant force center that is located behind the wheel link fixed pivot when the suspension is uncompressed.

16. The suspension system of claim 13, said suspension system further comprising a rearward moving instant force center that is located further to the front of the vehicle than the wheel link fixed pivot when the suspension is uncompressed.

17. The suspension system of claim 11, said suspension system further comprising a removable pivot axle; wherein said removable pivot axle has a feature for positioning a rear hub in relation to said wheel rotation axis, wherein said removable pivot axle can receive a thru axle selected from the group consisting of a solid axle, a thru axle, a hollow axle, a quick release, a skewer, a quick release skewer, and a through bolt.

18. The suspension system of claim 11, said suspension system further comprising a rear hub, a derailleur hanger, and a brake mount, said derailleur hanger being adjacent to one side of said rear hub, and said brake mount and brake link being positioned adjacent to the opposite side of said rear hub; wherein said wheel link is mounted outboard of and adjacent to said brake mount and said brake link.

19. The suspension system of claim 11, wherein said leverage ratio curve of said suspension system has a negative slope in the beginning ⅓ (third) and a positive slope in the end ⅓ (third), and a change in slope value in the middle ⅓ (third).

20. The suspension system of claim 11, wherein said leverage ratio curve of said suspension system has a positive slope in the beginning ⅓ (third) and a negative slope in the end ⅓ (third), and a change in slope value in the middle ⅓ (third).

21. A suspension system for a vehicle comprising a wheel link floating pivot, a wheel rotation axis, a wheel link, a control link, a brake link, a control link floating pivot, a control link fixed pivot, a shock absorber, and a removable pivot axle; wherein the distance between said wheel link floating pivot and control link floating pivot is greater than the distance between said control link fixed pivot and control link floating pivot; wherein said wheel link floating pivot is concentric with said wheel rotation axis; wherein said wheel link is pivotally connected to said brake link; wherein said brake link is pivotally connected to said control link; wherein said removable pivot axle has a feature for positioning a rear hub in relation to said wheel rotation axis; wherein said removable pivot axle can receive a thru axle selected from the group consisting of a solid axle, a thru axle, a hollow axle, a quick release, a skewer, a quick release skewer, and a through bolt; wherein said shock absorber is selected from the group consisting of a damper, a compression gas spring, a leaf spring, a coil spring, and a fluid; wherein force is transmitted to said shock absorber through an element selected from the group consisting of a brake link, a control link, a wheel link fixed pivot, a control link floating pivot and a control link fixed pivot; and wherein a leverage ratio curve of said suspension system has a negative or a positive slope in the beginning ⅓ (third) and in the end ⅓ (third), and a change in slope value in the middle ⅓ (third).

22. The suspension system of claim 21, said suspension system further comprising a rear hub, a derailleur hanger, and a brake mount, said derailleur hanger being adjacent to one side of said rear hub, and said brake mount and brake link being positioned adjacent to the opposite side of said rear hub; wherein said wheel link is mounted outboard of and adjacent to said brake mount and said brake link.

23. The suspension system of claim 21, said suspension system further comprising a forward moving instant force center that is located further to the front of the vehicle than the wheel link fixed pivot when the suspension is uncompressed.

24. The suspension system of claim 21, said suspension system further comprising a forward moving instant force center that is located behind the wheel link fixed pivot when the suspension is uncompressed.

25. The suspension system of claim 21, said suspension system further comprising a rearward moving instant force center that is located further to the front of the vehicle than the wheel link fixed pivot when the suspension is uncompressed.

26. The suspension system of claim 21, said suspension system further comprising a thru axle selected from the group consisting of a solid axle, a thru axle, a hollow axle, a quick release, a skewer, a quick release skewer, and a through bolt, such that a rear hub is mounted concentric to the wheel link floating pivot; and wherein said rear hub is positioned between components selected from the group consisting of said wheel link, said brake link and a pivot axle, such that said rear hub is removable.

27. The suspension system of claim 21, wherein said leverage ratio curve of said suspension system has a negative slope in the beginning ⅓ (third) and a positive slope in the end ⅓ (third), and a change in slope value in the middle ⅓ (third).

28. The suspension system of claim 21, wherein said leverage ratio curve of said suspension system has a positive slope in the beginning ⅓ (third) and a negative slope in the end ⅓ (third), and a change in slope value in the middle ⅓ (third).

29. A suspension system for a vehicle comprising a wheel link floating pivot, a wheel rotation axis, a wheel link, a control link, a brake link, a control link floating pivot, a control link fixed pivot, and a shock absorber; wherein the distance between said wheel link floating pivot and control link floating pivot is greater than the distance between said control link fixed pivot and control link floating pivot; wherein said wheel link is pivotally connected to said brake link; wherein said brake link is pivotally connected to said control link; wherein said wheel link floating pivot is concentric with said wheel rotation axis; wherein said shock absorber is selected from the group consisting of a damper, a compression gas spring, a leaf spring, a coil spring, and a fluid; wherein force is transmitted to said shock absorber through an element selected from the group consisting of the brake link, the control link, a wheel link fixed pivot, the control link floating pivot and the control link fixed pivot; wherein said suspension system further comprises a compressible wheel suspension travel distance that features a beginning travel point where the suspension is completely uncompressed to a point where no further suspension extension can take place, and an end travel point where a suspension is completely compressed to a point where no further suspension compression can take place; and wherein a leverage ratio curve of said suspension system has a negative or a positive slope in the beginning ⅓ (third) and in the end ⅓ (third), and a change in slope value in the middle ⅓ (third).

30. The suspension system of claim 29, said suspension system further comprising a thru axle selected from the group consisting of a solid axle, a thru axle, a hollow axle, a quick release, a skewer, a quick release skewer, and a through bolt, such that a rear hub is mounted concentric to the wheel link floating pivot; and wherein said rear hub is positioned between components selected from the group consisting of the wheel link, the brake link and a pivot axle, such that said rear hub is removable.

31. The suspension system of claim 29, said suspension system further comprising a rear hub, a derailleur hanger, and a brake mount, said derailleur hanger being adjacent to one side of said rear hub, and said brake mount and brake link being positioned adjacent to the opposite side of said rear hub; wherein said wheel link is mounted outboard of and adjacent to said brake mount and said brake link.

32. The suspension system of claim 29, said suspension system further comprising a forward moving instant force center that is located further to the front of the vehicle than the wheel link fixed pivot when the suspension is uncompressed.

33. The suspension system of claim 29, said suspension system further comprising a forward moving instant force center that is located behind the wheel link fixed pivot when the suspension is uncompressed.

34. The suspension system of claim 29, said suspension system further comprising a rearward moving instant force center that is located further to the front of the vehicle than the wheel link fixed pivot when the suspension is uncompressed.

35. The suspension system of claim 29, wherein said leverage ratio curve of said suspension system has a negative slope in the beginning ⅓ (third) and a positive slope in the end ⅓ (third), and a change in slope value in the middle ⅓ (third).

36. The suspension system of claim 29, wherein said leverage ratio curve of said suspension system has a positive slope in the beginning ⅓ (third) and a negative slope in the end ⅓ (third), and a change in slope value in the middle ⅓ (third).

37. A suspension system for a vehicle comprising a wheel link floating pivot, a wheel rotation axis, a wheel link, a control link, a control link fixed pivot, a brake link, a shock absorber, and a removable pivot axle; wherein said wheel link floating pivot is concentric with said wheel rotation axis; wherein said brake link is pivotally connected to said control link; wherein said removable pivot axle has a feature for positioning a rear hub in relation to said wheel rotation axis; wherein said removable pivot axle can receive a thru axle selected from the group consisting of a solid axle, a thru axle, a hollow axle, a quick release, a skewer, a quick release skewer, and a through bolt; wherein said shock absorber is selected from the group consisting of a damper, a compression gas spring, a leaf spring, a coil spring, and a fluid; wherein force is transmitted to said shock absorber through said brake link; and wherein a leverage ratio curve of said suspension system has a negative or a positive slope in the beginning ⅓ (third) and in the end ⅓ (third), and a change in slope value in the middle ⅓ (third).

38. The suspension system of claim 37, wherein force is transmitted to said shock absorber through said control link, a wheel link fixed pivot, and a control link floating pivot.

39. The suspension system of claim 37, said suspension system further comprising an instant force center that is in different locations when the suspension is fully compressed compared to the when the suspension is uncompressed.

40. The suspension system of claim 39, said suspension system further comprising a forward moving instant force center that is located further to the front of the vehicle than the wheel link fixed pivot when the suspension is uncompressed.

41. The suspension system of claim 39, said suspension system further comprising a forward moving instant force center that is located behind the wheel link fixed pivot when the suspension is uncompressed.

42. The suspension system of claim 39, said suspension system further comprising a rearward moving instant force center that is located further to the front of the vehicle than the wheel link fixed pivot when the suspension is uncompressed.

43. The suspension system of claim 37, said suspension system further comprising a rear hub, a derailleur hanger, and a brake mount, said derailleur hanger being adjacent to one side of said rear hub, and said brake mount and brake link being positioned adjacent to the opposite side of said rear hub; wherein said wheel link is mounted outboard of and adjacent to said brake mount and said brake link.

44. The suspension system of claim 37, wherein said leverage ratio curve of said suspension system has a negative slope in the beginning ⅓ (third) and a positive slope in the end ⅓ (third), and a change in slope value in the middle ⅓ (third).

45. The suspension system of claim 37, wherein said leverage ratio curve of said suspension system has a positive slope in the beginning ⅓ (third) and a negative slope in the end ⅓ (third), and a change in slope value in the middle ⅓ (third).

46. A suspension system for a vehicle comprising a wheel link floating pivot, a wheel rotation axis, a wheel link, a control link, a control link fixed pivot, a control link floating pivot, a brake link, and a shock absorber; wherein said shock absorber is selected from the group consisting of a damper, a compression gas spring, a leaf spring, a coil spring, and a fluid; wherein said wheel link is connected to said brake link through said wheel link floating pivot; wherein said control link is connected to said brake link through said control link floating pivot; wherein said wheel link floating pivot is concentric with said wheel rotation axis; wherein force is transmitted to said shock absorber through said brake link; and said suspension system further comprising a compressible wheel suspension travel distance that features a beginning travel point where the suspension is completely uncompressed to a point where no further suspension extension can take place, and an end travel point where a suspension is completely compressed to a point where no further suspension compression can take place; and wherein a leverage ratio curve of said suspension system has a negative or a positive slope in the beginning ⅓ (third) and in the end ⅓ (third), and a change in slope value in the middle ⅓ (third).

47. The suspension system of claim 46, wherein force is transmitted to said shock absorber through said control link, a wheel link fixed pivot, and said control link floating pivot.

48. The suspension system of claim 46, said suspension system further comprising an instant force center that is in different locations when the suspension is fully compressed compared to the when the suspension is uncompressed.

49. The suspension system of claim 48, said suspension system further comprising a forward moving instant force center that is located further to the front of the vehicle than the wheel link fixed pivot when the suspension is uncompressed.

50. The suspension system of claim 48, said suspension system further comprising a forward moving instant force center that is located behind the wheel link fixed pivot when the suspension is uncompressed.

51. The suspension system of claim 48, said suspension system further comprising a rearward moving instant force center that is located further to the front of the vehicle than the wheel link fixed pivot when the suspension is uncompressed.

52. The suspension system of claim 46, said suspension system further comprising a rear hub, a derailleur hanger, and a brake mount, said derailleur hanger being adjacent to one side of said rear hub, and said brake mount and brake link being positioned adjacent to the opposite side of said rear hub; wherein said wheel link is mounted outboard of and adjacent to said brake mount and said brake link.

53. The suspension system of claim 46, said suspension system further comprising a thru axle selected from the group consisting of a solid axle, a thru axle, a hollow axle, a quick release, a skewer, a quick release skewer, and a through bolt, such that a rear hub is mounted concentric to the wheel link floating pivot; and wherein said rear hub is positioned between components selected from the group consisting of the wheel link, the brake link and a pivot axle, such that said rear hub is removable.

54. The suspension system of claim 46, wherein said leverage ratio curve of said suspension system has a negative slope in the beginning ⅓ (third) and a positive slope in the end ⅓ (third), and a change in slope value in the middle ⅓ (third).

55. The suspension system of claim 46, wherein said leverage ratio curve of said suspension system has a positive slope in the beginning ⅓ (third) and a negative slope in the end ⅓ (third), and a change in slope value in the middle ⅓ (third).

56. A suspension system for a vehicle comprising a wheel link floating pivot, a wheel rotation axis, a wheel link, a control link, a control link fixed pivot, a brake link, a shock absorber, and a thru axle; wherein said thru axle is selected from the group consisting of a solid axle, a thru axle, a hollow axle, a quick release, a skewer, a quick release skewer, and a through bolt, such that a rear hub is mounted concentric to the wheel link floating pivot; wherein said rear hub is positioned between components selected from the group consisting of the wheel link, the brake link and a pivot axle, such that said rear hub is removable; wherein said wheel link floating pivot is concentric with said wheel rotation axis or within 2 cm thereof; wherein said shock absorber is selected from the group consisting of a damper, a compression gas spring, a leaf spring, a coil spring, and a fluid; wherein said shock absorber is mounted to a link selected from the group consisting of the brake link and the control link, such that said shock absorber is able to respond to movement of a rear wheel; wherein said brake link is pivotally connected to said control link; wherein as the suspension is compressed or extended, said shock absorber is compressed or extended, so that force that compresses or extends said shock absorber is transmitted through said brake link and said wheel link floating pivot; and wherein a leverage ratio curve of said suspension system has a negative or a positive slope in the beginning ⅓ (third) and in the end ⅓ (third), and a change in slope value in the middle ⅓ (third).

57. The suspension system of claim 56, wherein force is transmitted to said shock absorber through said control link and a control link floating pivot.

58. The suspension system of claim 57, said suspension system further comprising an instant force center that is in different locations when the suspension is fully compressed compared to the when the suspension is uncompressed.

59. The suspension system of claim 58, said suspension system further comprising a forward moving instant force center that is located further to the front of the vehicle than the wheel link fixed pivot when the suspension is uncompressed.

60. The suspension system of claim 58, said suspension system further comprising a forward moving instant force center that is located behind the wheel link fixed pivot when the suspension is uncompressed.

61. The suspension system of claim 58, said suspension system further comprising a rearward moving instant force center that is located further to the front of the vehicle than the wheel link fixed pivot when the suspension is uncompressed.

62. The suspension system of claim 56, said suspension system further comprising a removable pivot axle; wherein said removable pivot axle has a feature for positioning a rear hub in relation to a wheel rotation axis, wherein said removable pivot axle can receive a thru axle selected from the group consisting of a solid axle, a thru axle, a hollow axle, a quick release, a skewer, a quick release skewer, and a through bolt.

63. The suspension system of claim 56, said suspension system further comprising a rear hub, a derailleur hanger, and a brake mount, said derailleur hanger being adjacent to one side of said rear hub, and said brake mount and brake link being positioned adjacent to the opposite side of said rear hub, wherein said wheel link is mounted outboard of and adjacent to said brake mount and said brake link.

64. The suspension system of claim 56, wherein said leverage ratio curve of said suspension system has a negative slope in the beginning ⅓ (third) and a positive slope in the end ⅓ (third), and a change in slope value in the middle ⅓ (third).

65. The suspension system of claim 56, wherein said leverage ratio curve of said suspension system has a positive slope in the beginning ⅓ (third) and a negative slope in the end ⅓ (third), and a change in slope value in the middle ⅓ (third).

66. A suspension system for a vehicle comprising a wheel link floating pivot, a wheel rotation axis, a wheel link, a control link, a control link fixed pivot, a brake link, a shock absorber, and a removable pivot axle; wherein said wheel link floating pivot is concentric with said wheel rotation axis or within 2 cm thereof; wherein said brake link is pivotally connected to said control link; wherein said removable pivot axle has a feature for positioning a rear hub in relation to said wheel rotation axis; wherein said removable pivot axle can receive a thru axle selected from the group consisting of a solid axle, a thru axle, a hollow axle, a quick release, a skewer, a quick release skewer, and a through bolt; wherein said shock absorber is selected from the group consisting of a damper, a compression gas spring, a leaf spring, a coil spring, and a fluid; wherein force is transmitted to said shock absorber through said brake link; and wherein a leverage ratio curve of said suspension system has a negative or a positive slope in the beginning ⅓ (third) and in the end ⅓ (third), and a change in slope value in the middle ⅓ (third).

67. The suspension system of claim 66, wherein force is transmitted to said shock absorber through said control link, a wheel link fixed pivot, and a control link floating pivot.

68. The suspension system of claim 66, said suspension system further comprising an instant force center that is in different locations when the suspension is fully compressed compared to the when the suspension is uncompressed.

69. The suspension system of claim 68, said suspension system further comprising a forward moving instant force center that is located further to the front of the vehicle than the wheel link fixed pivot when the suspension is uncompressed.

70. The suspension system of claim 68, said suspension system further comprising a forward moving instant force center that is located behind the wheel link fixed pivot when the suspension is uncompressed.

71. The suspension system of claim 68, said suspension system further comprising a rearward moving instant force center that is located further to the front of the vehicle than the wheel link fixed pivot when the suspension is uncompressed.

72. The suspension system of claim 66, said suspension system further comprising a rear hub, a derailleur hanger, and a brake mount, said derailleur hanger being adjacent to one side of said rear hub, and said brake mount and brake link being positioned adjacent to the opposite side of said rear hub; wherein said wheel link is mounted outboard of and adjacent to said brake mount and said brake link.

73. The suspension system of claim 66, wherein said leverage ratio curve of said suspension system has a negative slope in the beginning ⅓ (third) and a positive slope in the end ⅓ (third), and a change in slope value in the middle ⅓ (third).

74. The suspension system of claim 66, wherein said leverage ratio curve of said suspension system has a positive slope in the beginning ⅓ (third) and a negative slope in the end ⅓ (third), and a change in slope value in the middle ⅓ (third).

75. A suspension system for a vehicle comprising a wheel link floating pivot, a wheel rotation axis, a wheel link, a control link, a control link fixed pivot, a brake link, a shock absorber, and a thru axle; wherein said thru axle is selected from the group consisting of a solid axle, a thru axle, a hollow axle, a quick release, a skewer, a quick release skewer, and a through bolt, such that a rear hub is mounted concentric to the wheel link floating pivot; wherein said rear hub is positioned between components selected from the group consisting of the wheel link, the brake link and a pivot axle, such that said rear hub is removable; wherein said wheel link floating pivot is concentric with said wheel rotation axis; wherein said shock absorber is selected from the group consisting of a damper, a compression gas spring, a leaf spring, a coil spring, and a fluid; wherein said shock absorber is mounted to a link selected from the group consisting of the brake link and the control link, such that said shock absorber is able to respond to movement of a rear wheel; wherein said brake link is pivotally connected to said control link; wherein said control link fixed pivot is located below a shock pivot, wherein as the suspension is compressed or extended, said shock absorber is compressed or extended, so that force that compresses or extends said shock absorber is transmitted through said brake link and said wheel link floating pivot; and wherein a leverage ratio curve of said suspension system has a negative or a positive slope in the beginning ⅓ (third) and in the end ⅓ (third), and a change in slope value in the middle ⅓ (third).

76. The suspension system of claim 75, wherein force is transmitted to said shock absorber through said control link, a wheel link fixed pivot, and a control link floating pivot.

77. The suspension system of claim 75, said suspension system further comprising an instant force center that is in different locations when the suspension is fully compressed compared to the when the suspension is uncompressed.

78. The suspension system of claim 77, said suspension system further comprising a forward moving instant force center that is located further to the front of the vehicle than the wheel link fixed pivot when the suspension is uncompressed.

79. The suspension system of claim 77, said suspension system further comprising a forward moving instant force center that is located behind the wheel link fixed pivot when the suspension is uncompressed.

80. The suspension system of claim 77, said suspension system further comprising a rearward moving instant force center that is located further to the front of the vehicle than the wheel link fixed pivot when the suspension is uncompressed.

81. The suspension system of claim 75, said suspension system further comprising a rear hub, a derailleur hanger, and a brake mount, said derailleur hanger being adjacent to one side of said rear hub, and said brake mount and brake link being positioned adjacent to the opposite side of said rear hub; wherein said wheel link is mounted outboard of and adjacent to said brake mount and said brake link.

82. The suspension system of claim 75, wherein said leverage ratio curve of said suspension system has a negative slope in the beginning ⅓ (third) and a positive slope in the end ⅓ (third), and a change in slope value in the middle ⅓ (third).

83. The suspension system of claim 75, wherein said leverage ratio curve of said suspension system has a positive slope in the beginning ⅓ (third) and a negative slope in the end ⅓ (third), and a change in slope value in the middle ⅓ (third).

84. A suspension system for a vehicle comprising a wheel link floating pivot, a wheel rotation axis, a wheel link, a control link, a control link fixed pivot, a brake link, a shock absorber, and a thru axle; wherein said thru axle is selected from the group consisting of a solid axle, a thru axle, a hollow axle, a quick release, a skewer, a quick release skewer, and a through bolt, such that a rear hub is mounted concentric to the wheel link floating pivot; wherein said rear hub is positioned between components selected from the group consisting of the wheel link, the brake link and a pivot axle, such that said rear hub is removable; wherein said wheel link floating pivot is concentric with said wheel rotation axis; wherein movement of said control link about said control link fixed pivot consists of one degree of freedom; wherein said shock absorber is selected from the group consisting of a damper, a compression gas spring, a leaf spring, a coil spring, and a fluid; wherein said shock absorber is mounted to a link selected from the group consisting of the brake link and the control link, such that said shock absorber is able to respond to movement of a rear wheel; wherein said brake link is pivotally connected to said control link; wherein as the suspension is compressed or extended, said shock absorber is compressed or extended, so that force that compresses or extends said shock absorber is transmitted through said brake link and said wheel link floating pivot; and wherein a leverage ratio curve of said suspension system has a negative or a positive slope in the beginning ⅓ (third) and in the end ⅓ (third), and a change in slope value in the middle ⅓ (third).

85. The suspension system of claim 84, wherein force is transmitted to said shock absorber through said control link and a control link floating pivot.

86. The suspension system of claim 84, said suspension system further comprising an instant force center that is in different locations when the suspension is fully compressed compared to the when the suspension is uncompressed.

87. The suspension system of claim 84, wherein said leverage ratio curve of said suspension system has a negative slope in the beginning ⅓ (third) and a positive slope in the end ⅓ (third), and a change in slope value in the middle ⅓ (third).

88. The suspension system of claim 84, wherein said leverage ratio curve of said suspension system has a positive slope in the beginning ⅓ (third) and a negative slope in the end ⅓ (third), and a change in slope value in the middle ⅓ (third).

89. The suspension system of claim 84, said suspension system further comprising a removable pivot axle; wherein said removable pivot axle has a feature for positioning said rear hub in relation to a wheel rotation axis, wherein said removable pivot axle can receive said thru axle selected from the group consisting of a solid axle, a thru axle, a hollow axle, a quick release, a skewer, a quick release skewer, and a through bolt.

90. The suspension system of claim 84, said suspension system further comprising a rear hub, a derailleur hanger, and a brake mount, said derailleur hanger being adjacent to one side of said rear hub, and said brake mount and brake link being positioned adjacent to the opposite side of said rear hub, wherein said wheel link is mounted outboard of and adjacent to said brake mount and said brake link.

91. A suspension system for a vehicle comprising a wheel link floating pivot, a wheel rotation axis, a wheel link, a control link, a control link fixed pivot, a brake link, and a shock absorber; wherein said wheel link floating pivot is concentric with said wheel rotation axis; wherein said shock absorber is selected from the group consisting of a damper, a compression gas spring, a leaf spring, a coil spring, and a fluid; and wherein said shock absorber is mounted to a link selected from the group consisting of the brake link and the control link, such that said shock absorber is able to respond to movement of a rear wheel; wherein said brake link is pivotally connected to said control link; wherein movement of said control link about said control link fixed pivot consists of one degree of freedom; wherein as the suspension is compressed or extended, said shock absorber is compressed or extended, so that force that compresses or extends said shock absorber is transmitted through said brake link and said wheel link floating pivot; wherein said suspension system comprises a compressible wheel suspension travel distance that features a beginning travel point where the suspension is completely uncompressed to a point where no further suspension extension can take place, and an end travel point where a suspension is completely compressed to a point where no further suspension compression can take place; and wherein a leverage ratio curve of said suspension system has a negative or a positive slope in the beginning ⅓ (third) and in the end ⅓ (third), and a change in slope value in the middle ⅓ (third).

92. The suspension system of claim 91, wherein force is transmitted to said shock absorber through said control link and a control link floating pivot.

93. The suspension system of claim 91, said suspension system further comprising an instant force center that is in different locations when the suspension is fully compressed compared to the when the suspension is uncompressed.

94. The suspension system of claim 91, wherein said leverage ratio curve of said suspension system has a negative slope in the beginning ⅓ (third) and a positive slope in the end ⅓ (third), and a change in slope value in the middle ⅓ (third).

95. The suspension system of claim 91, wherein said leverage ratio curve of said suspension system has a positive slope in the beginning ⅓ (third) and a negative slope in the end ⅓ (third), and a change in slope value in the middle ⅓ (third).

96. The suspension system of claim 91, said suspension system further comprising a removable pivot axle; wherein said removable pivot axle has a feature for positioning a rear hub in relation to a said wheel rotation axis, wherein said removable pivot axle can receive a thru axle selected from the group consisting of a solid axle, a thru axle, a hollow axle, a quick release, a skewer, a quick release skewer, and a through bolt.

97. The suspension system of claim 91, said suspension system further comprising a rear hub, a derailleur hanger, and a brake mount, said derailleur hanger being adjacent to one side of said rear hub, and said brake mount and brake link being positioned adjacent to the opposite side of said rear hub; wherein said wheel link is mounted outboard of and adjacent to said brake mount and said brake link.

\* \* \* \* \*